(12) United States Patent
Lee

(10) Patent No.: US 7,227,607 B2
(45) Date of Patent: *Jun. 5, 2007

(54) ARRAY SUBSTRATE FOR IN-PLANE SWITCHING MODE LIQUID CRYSTAL DISPLAY DEVICE AND METHOD OF FABRICATING THE SAME

(75) Inventor: Yun-Bok Lee, Seoul (KR)

(73) Assignee: LG.Philips LCD Co., Ltd, Seoul (KR)

( * ) Notice: Subject to any disclaimer, the term of this patent is extended or adjusted under 35 U.S.C. 154(b) by 294 days.

This patent is subject to a terminal disclaimer.

(21) Appl. No.: 10/825,594

(22) Filed: Apr. 16, 2004

(65) Prior Publication Data

US 2005/0128409 A1    Jun. 16, 2005

(30) Foreign Application Priority Data

Dec. 11, 2003  (KR) ............... 10-2003-0090358
Apr. 14, 2004  (KR) ............... 10-2004-0025956

(51) Int. Cl.
*G02F 1/1368* (2006.01)
*G02F 1/1343* (2006.01)
*G02F 1/139* (2006.01)

(52) U.S. Cl. ............... 349/141; 349/38; 349/43; 349/106; 349/110; 349/187; 438/30

(58) Field of Classification Search ............ 349/38, 349/39, 43, 110, 14, 146, 187, 106, 122, 138; 257/59, 72; 345/92; 438/30
See application file for complete search history.

(56) References Cited

U.S. PATENT DOCUMENTS 5,069,813 A    12/1991  Patel

| 5,434,687 | A | | 7/1995 | Kawata et al. |
| 5,610,743 | A | | 3/1997 | Tsai |
| 5,977,562 | A | * | 11/1999 | Hirakata et al. ............ 257/72 |
| 6,243,154 | B1 | | 6/2001 | You et al. |
| 2003/0053020 | A1 | | 3/2003 | Okada et al. |

FOREIGN PATENT DOCUMENTS

| JP | 09-230311 | 9/1997 |
| JP | 9-325340 | 12/1997 |
| JP | 9-325450 | 12/1997 |
| KR | 1999-0048947 | 7/1999 |
| KR | 1999-0058889 | 7/1999 |

* cited by examiner

*Primary Examiner*—Toan Ton
*Assistant Examiner*—Tai Duong
(74) *Attorney, Agent, or Firm*—McKenna Long & Aldridge LLP

(57) ABSTRACT

An array substrate for an in-plane switching liquid crystal display device includes: a gate line on a substrate; a data line crossing the gate line to define a pixel region; a thin film transistor connected to the gate line and the data line; a common line parallel to and spaced apart from the gate line; a common electrode extending from the common line and including a plurality of common electrode patterns; a pixel connecting line connected to a capacitor electrode; and a pixel electrode extending from the pixel connecting line and including a plurality of pixel electrode patterns, wherein one of the plurality of common electrode patterns and one of the plurality of pixel electrode patterns form concentric rings of pixel and common electrode patterns that are within an open region of another one of the plurality of common electrode patterns.

27 Claims, 30 Drawing Sheets

ARRAY SUBSTRATE FOR IN-PLANE SWITCHING MODE LIQUID CRYSTAL DISPLAY DEVICE AND METHOD OF FABRICATING THE SAME

This application claims the benefit of Korean Patent Application Nos. 2003-090358 and 2004-0025956, filed on Dec. 11, 2003 and on Apr. 14, 2004, respectively, which is hereby incorporated by reference as if fully set forth herein.

BACKGROUND OF THE INVENTION

1. Field of the Invention

The present invention relates to a liquid crystal display device. More particularly it relates to a liquid crystal display device implementing in-plane switching (IPS) in which an electric field is generated in a plane that is parallel to the substrate of the device.

2. Discussion of the Related Art

A liquid crystal display device uses the optical anisotropy and polarization properties of liquid crystal molecules to produce an image. The long thin shapes of the liquid crystal can be aligned to have an orientation in a specific direction. The alignment direction of the liquid crystals can be controlled by an applied electric field. In other words, as an applied electric field changes, so does the alignment of the liquid crystal molecules. Due to the optical anisotropy of the liquid crystal, the refraction of incident light depends on the alignment direction of the liquid crystal molecules. Thus, by properly controlling an electric field applied to a group of liquid crystal molecules in respective pixels, a desired image can be produced by diffracting light.

There are many types liquid crystal displays (LCDs). One type of LCD is an active matrix LCD (AM-LCD) that has a matrix of pixels. Each of the pixels in an AM-LCD has a thin film transistor (TFT) and pixel electrode. AM-LCDs are the subject of significant research and development because of their high resolution and superiority in displaying moving images.

LCD devices have wide application in office automation (OA) equipment and video units because they have the characteristics of light weight, thin profile and low power consumption. The typical liquid crystal display panel of an LCD device has an upper substrate, a lower substrate and a liquid crystal layer interposed therebetween. The upper substrate, commonly referred to as a color filter substrate, usually includes a common electrode and color filters. The lower substrate, commonly referred to as an array substrate, includes switching elements, such as thin film transistors, and pixel electrodes.

The operation of an LCD device is based on the principle that the alignment direction of the liquid crystal molecules is dependent upon an electric field applied between the common electrode and the pixel electrode. More particularly, the alignment direction of the liquid crystal molecules is controlled by the application of an electric field to the liquid crystal layer. When the alignment direction of liquid crystal molecules is properly controlled in each pixel of a group of pixels, incident light is refracted along the alignment direction in a plurality of pixels to display image data. Thus, liquid crystal molecules in the pixels function as an optical modulation element having variable optical characteristics that depend upon polarity of the applied voltage.

In a conventional LCD device, the pixel electrode and common electrode are positioned on the lower substrate and upper substrate, respectively. Thus, a longitudinal electric field is induced between the lower and upper substrates of a conventional LCD device. This longitudinal electric field is perpendicular to the lower and upper substrates. However, conventional LCD devices having the longitudinal electric field have a drawback in that they have a very narrow viewing angle.

To solve the problem of narrow viewing angle, in-plane switching liquid crystal display (IPS-LCD) device has been proposed. The IPS-LCD device typically includes a lower substrate on which a pixel electrode and a common electrode are disposed, an upper substrate having no electrode, and a liquid crystal interposed between the upper and lower substrates. A detailed explanation about operation modes of a typical IPS-LCD panel will be provided in reference to FIG. 1.

FIG. 1 is a cross-sectional view illustrating a concept of a related art IPS-LCD panel. As shown in FIG. 1, upper substrate 10 and lower substrate 20 are spaced apart from each other, and a liquid crystal layer 30 is interposed therebetween. The upper substrate 10 and lower substrate 20 are often referred to as a color filter substrate and an array substrate, respectively. A common electrode 22 and a pixel electrode 24 are located on the lower substrate 20. The common electrode 22 and pixel electrode 24 are parallel alignment with respect to each other. A color filter layer (not shown) is positioned in an area of the surface of the upper substrate 10 that corresponds to an area between the pixel electrode 24 and the common electrode 22 of the lower substrate 20.

A voltage applied across the common electrode 22 and pixel electrode 24 produces an electric field 26 through liquid crystal molecules 32. The liquid crystal molecules 32 have a positive dielectric anisotropy, and thus orient to have an alignment which is parallel with the electric field 26. When no electric field is produced between the common electrode 22 and pixel electrode 24, i.e., "off state", the longitudinal axes of the liquid crystal (LC) molecules 32 are aligned in a direction that is parallel to and form a definite angle with the common electrode 22 and pixel electrode 24. For example, the longitudinal axes of the LC molecules 32 are arranged in a direction parallel with both the common electrode 22 and pixel electrode 24. In contrast, when a voltage is applied across the common electrode 22 and pixel electrode 24, i.e., "on state", a lateral electric field 26 parallel to the surface of the lower substrate 20 is produced because the common electrode 22 and pixel electrode are on the lower substrate 20. Accordingly, the LC molecules 32 are re-arranged to bring their longitudinal axes into coincidence with the electric field 26. Since the LC molecules switch directions while maintaining their longitudinal axes in a plane perpendicular to the direct viewing direction of a display, in-plane switching can permit a wide viewing angle for a display device. The viewing angles can range from 80 to 85 degrees in up-and-down and left-and-right views from a line vertical to the IPS-LCD panel, for example.

FIG. 2 is a plan view illustrating one pixel of an array substrate according to a related art IPS-LCD device. As shown in FIG. 2, a gate line 40 is transversely arranged across the figure and a data line 42 is disposed substantially perpendicular to the gate line 40. A common line 50 is also transversely arranged across the figure parallel with the gate line 40 and is spaced apart from the gate line 40. The gate line 40, the common line 50 and the data line 42 define a pixel region P on the array substrate. A thin film transistor (TFT) is disposed at a corner of the pixel region P near the crossing of the gate line 40 and data line 42.

In each pixel, three common electrodes 44 extend perpendicularly from the common line 50, and two of the common electrodes 44 are disposed next to the data line 42 and the data line of another pixel, respectively. A pixel connecting line 48 that electrically connects to the TFT T is disposed next to the gate line 40 and is parallel with the gate line 40. Pixel electrodes 46 extend perpendicularly from the pixel connecting line 48. Each of the pixel electrodes 46 is disposed between two of the common electrodes 44 and are parallel with the data line 42. Each of areas "I" between the respective common electrodes 44 and the respective pixel electrodes 46 is defined as a block where the liquid crystal molecules are re-arranged by an electric field. As shown in FIG. 2, there can be four blocks in one pixel.

The IPS-LCD device shown in FIG. 2 re-arranges and operates the liquid crystal molecules using an electric field generated that is parallel with the array substrate. Thus, the IPS-LCD device can provide a wide viewing angle as opposed to an LCD device using an electric field that is perpendicular to the array substrate. Recently, modifications to the IPS-LCD device have been researched for further increasing the viewing angle.

FIG. 3 is a plan view of an array substrate having multiple domains according to another related art IPS-LCD device. Some detailed explanations, especially those previously explained in reference to FIG. 2, will be omitted with regard to FIG. 3 to prevent duplicate explanations. As shown in FIG. 3, a pixel connecting line 58 is disposed over a common line 60. Common electrodes 54 and pixel electrodes 56 extend in an up-and-down direction from the common line 60 and pixel connecting line 58, respectively. Both the common electrodes 54 and pixel electrodes 56 have a zigzag shape with plural bent portions that alternate with each other. However, corresponding portions of the common electrode 54 and pixel electrodes 56 are parallel to each other. The zigzag shape defines the multiple domains in the pixel regions that are symmetrical to the bent portions of the common electrode 54 and pixel electrode 56. This zigzag shape with multiple domains further improves the viewing angle as compared to the straight shape shown in FIG. 2.

Moreover, the pixel connecting line 58 overlaps the common line 60, as shown in FIG. 3, so that an overlapped area becomes a storage capacitor $C_{ST}$. More particularly, the pixel connecting line 58 acts as one electrode of the storage capacitor $C_{ST}$, while the overlapped portion of the common line 60 acts as the other electrode of the storage capacitor $C_{ST}$. One of the pixel electrodes 56 of the pixel is connected to a drain electrode 62 so that all of the pixel electrodes 56 can electrically communicate with the TFT T. However, the IPS-LCD device having the above-mentioned multi domains has a problem of color shift depending on the viewing angles, because the liquid crystal molecules have long and thin shapes.

FIG. 4 is a graph illustrating a viewing angle of the IPS-LCD device having the zigzag structure shown in FIG. 3. The IPS-LCD device having the zigzag-shaped common electrode and pixel electrode can have an improved viewing angles in the directions of ±90 and ±180 degrees, i.e., in right-and-left and up-and-down directions, as illustrated by references "IVa" and "IVb" in FIG. 4. However, the viewing angles are degraded in the directions of ±45 and ±135 degrees, i.e., in diagonal directions, as illustrated by references "IVc" and "IVd" in FIG. 4. Further, color shift also occurs depending on the viewing angles or directions.

When the voltages applied across the common electrode and pixel electrode generate the electric fields between the common electrode and pixel electrode, the liquid crystal molecules rotate about 45 degrees to re-align in accordance with the electric fields. Gray inversion can occur due to the rotation of the liquid crystal molecules. Especially, when the IPS-LCD is operated in gray mode, the IPS-LCD produces yellowish color shift in 45(+45) degrees declination with respect to the liquid crystal polarization because of the optical anisotropy properties of liquid crystal molecules. In addition, a bluish color shift in 135(−45) degrees declination with respect to the liquid crystal polarization can occur because of the optical anisotropy properties of the liquid crystal molecules.

SUMMARY OF THE INVENTION

Accordingly, the present invention is directed to an array substrate for an IPS-LCD device that substantially obviates one or more of the problems due to limitations and disadvantages of the related art.

An advantage of the present invention is to provide an array substrate and a method of forming the array substrate for an IPS-LCD device to increase the viewing angle.

Another advantage of the present invention is to provide an array substrate and a method of forming the array substrate for an IPS-LCD device to prevent a color shift.

Another advantage of the present invention is to provide an array substrate and a method of forming the array substrate for an IPS-LCD device to provide a uniform director of liquid crystal molecules in all directions.

Another advantage of the present invention is to provide an array substrate and a method of forming the array substrate for an IPS-LCD device to improve the aperture ratio.

Additional features and advantages of the invention will be set forth in the description which follows and in part will be apparent from the description, or may be learned by practice of the invention. These and other advantages of the invention will be realized and attained by the structure particularly pointed out in the written description and claims hereof as well as the appended drawings.

To achieve these and other advantages, an embodiment in accordance with the principles of the present invention provides an array substrate for use in an in-plane switching liquid crystal display device. The array substrate for an in-plane switching liquid crystal display device includes: a gate line on a substrate; a data line crossing the gate line to define a pixel region; a thin film transistor connected to the gate line and the data line; a common line parallel to and spaced apart from the gate line, a common electrode extending from the common line and including a plurality of common electrode patterns; a pixel connecting line connected to a capacitor electrode; and a pixel electrode extending from the pixel connecting line and including a plurality of pixel electrode patterns, wherein one of the plurality of common electrode patterns and one of the plurality of pixel electrode patterns form concentric rings of pixel and common electrode patterns that are within an open region of another one of the plurality of common electrode patterns.

In another aspect of the present invention, an array substrate for an in-plane switching liquid crystal display device includes: a gate line on a substrate; a data line crossing the gate line to define a pixel region; a thin film transistor including a drain electrode and connected to the gate line and the data line; a common line parallel to and spaced apart from the gate line; a pixel connecting line extending from the drain electrode; a common electrode contacting the common line and including a plurality of common electrode patterns; and a pixel electrode contacting the pixel connecting line and including a plurality of pixel electrode patterns, wherein one of the plurality of common electrode patterns has two symmetric half-ring shaped portions and one of the plurality of pixel electrode patterns two symmetric half-ring shaped portions that are concentrically arranged within an open region of another one of the plurality of common electrode patterns.

In another aspect of the present invention, an array substrate for an in-plane switching liquid crystal display device includes: a gate line on a substrate; a data line crossing the gate line to define a pixel region; a thin film transistor including a drain electrode and connected to the gate line and the data line; a common line parallel to and spaced apart from the gate line; a pixel connecting line extending from the drain electrode; a passivation layer having first and second contact holes on the pixel connecting line, the first contact hole exposing the common electrode and the second contact hole exposing the pixel connecting line; a common electrode contacting the common line through the first contact hole and including a plurality of common electrode patterns; and a pixel electrode contacting the pixel connecting line through the second contact hole and including a plurality of pixel electrode patterns, wherein one of the plurality of common electrode patterns and one of the plurality of pixel electrode patterns form concentric rings of pixel and common electrode patterns that are within an open region of another one of the plurality of common electrode patterns.

In another aspect of the present invention, an array substrate for an in-plane switching liquid crystal display device includes: a gate line on a substrate; a data line crossing the gate line to define a pixel region; a thin film transistor including a drain electrode and connected to the gate line and the data line; a common line parallel to and spaced apart from the gate line; a common electrode extending from the common line and including first and second common electrode patterns; and a pixel electrode extending from the drain electrode and including first and second pixel electrode patterns, wherein the first common electrode pattern has corner portions and defines an open region that has a substantially rectangular shape, and the second common electrode pattern has a spiral shape and the second pixel electrode pattern has a spiral shape.

In another aspect of the present invention, a method of fabricating an array substrate for an in-plane switching liquid crystal display device includes: forming a gate line having a gate electrode, a common electrode including a plurality of common electrode patterns and a common line parallel to and spaced apart from the gate line on a substrate through a first mask process; forming a gate insulating layer on the gate line, the common electrode and the common line; forming a data line crossing the gate line to define a pixel region, a source electrode extending from the data line, a drain electrode spaced apart from the source electrode and a semiconductor layer corresponding to the data line, the source electrode and the drain electrode through a second mask process, the semiconductor layer being exposed between the source and drain electrodes, the gate electrode, the semiconductor layer, the source electrode and the drain electrode constituting a thin film transistor; forming a passivation layer on the thin film transistor through a third mask process, the passivation layer having a drain contact hole exposing the drain electrode; and forming a capacitor electrode overlapping the common electrode and being connected to the drain electrode, a pixel connecting line connected to the capacitor electrode and a pixel electrode extending from the pixel connecting line and including a plurality of pixel electrode patterns on the passivation layer through a fourth mask process, wherein one of the plurality of common electrode patterns and one of the plurality of pixel electrode patterns form concentric rings of pixel and common electrode patterns that are within an open region of another one of the plurality of common electrode patterns.

In another aspect of the present invention, a method of fabricating an array substrate for an in-plane switching liquid crystal display device includes: forming a gate line having a gate electrode, a common electrode including a plurality of common electrode patterns and a common line parallel to and spaced apart from the gate line on a substrate through a first mask process; forming a gate insulating layer on the gate line, the common electrode and the common line; forming a data line crossing the gate line to define a pixel region, a source electrode extending from the data line, a drain electrode spaced apart from the source electrode, a pixel connecting line extending from the drain electrode, a capacitor electrode extending from the pixel connecting line and a semiconductor layer corresponding to the data line, the source electrode, the drain electrode, the pixel connecting line and the capacitor electrode through a second mask process, the semiconductor layer being exposed between the source and drain electrodes, the gate electrode, the semiconductor layer, the source electrode and the drain electrode constituting a thin film transistor; forming a photoresist pattern on the thin film transistor through a third mask process, the photoresist pattern corresponding to a plurality of regions between the plurality of common electrode patterns; forming a transparent conductive layer on an entire surface of the substrate having the photoresist pattern; and removing the transparent conductive layer on the photoresist pattern by stripping the photoresist pattern to obtain a pixel electrode contacting the pixel connecting line and including a plurality of pixel electrode patterns, wherein one of the plurality of common electrode patterns and one of the plurality of pixel electrode patterns form concentric rings of pixel and common electrode patterns that are within an open region of another one of the plurality of common electrode patterns.

In another aspect of the present invention, a method of fabricating an array substrate for an in-plane switching liquid crystal display device includes: forming a gate line having a gate electrode and a common line parallel to and spaced apart from the gate line on a substrate through a first mask process; forming a gate insulating layer on the gate line and the common line; forming a data line crossing the gate line to define a pixel region, a source electrode extending from the data line, a drain electrode spaced apart from the source electrode, a pixel connecting line extending from the drain electrode, a capacitor electrode extending from the pixel connecting line and a semiconductor layer corresponding to the data line, the source electrode, the drain electrode, the pixel connecting line and the capacitor electrode through a second mask process, the semiconductor layer being exposed between the source and drain electrodes, the gate electrode, the semiconductor layer, the source electrode and the drain electrode constituting a thin film transistor; forming a photoresist pattern on the thin film transistor through a third mask process, the photoresist pattern including first two symmetric open portions separated from the pixel connecting line and second two symmetric open portions separated from the common line; etching the gate insulating layer using the photoresist pattern as an etch mask to expose the common line; forming a transparent conductive layer on an entire surface of the substrate having the photoresist pattern; and removing the transparent conductive layer on the photoresist pattern by stripping the photoresist pattern to obtain a common electrode contacting the common line and including a plurality of common electrode patterns and a pixel electrode contacting the pixel connecting line and including a plurality of pixel electrode patterns, wherein the plurality of common electrode patterns and the plurality of pixel electrode patterns include two symmetric portions having a concentric half-ring shape except for an outermost common electrode pattern and an inmost common electrode patterns, wherein each common electrode pattern is separated from the pixel connecting line and each pixel electrode pattern is separated from the common line, wherein the outermost common electrode pattern has a half-rectangular shape including corner portions and the inmost common electrode pattern is formed inside a region corresponding to the pixel connecting line.

In another aspect of the present invention, a method of fabricating an array substrate for an in-plane switching liquid crystal display device includes: forming a gate line having a gate electrode, a common line parallel to and spaced apart from the gate line, a common electrode extending from the common line and including first and second common electrode patterns on a substrate through a first mask process; forming a gate insulating layer on the gate line, the common line and the common electrode; forming a semiconductor layer on the gate insulating layer over the gate electrode through a second mask process, the semiconductor layer having an island shape; forming a data line crossing the gate line to define a pixel region, a source electrode extending from the data line and a drain electrode spaced apart from the source electrode through a third mask process, the gate electrode, the semiconductor layer, the source electrode and the drain electrode constituting a thin film transistor; forming a passivation layer having a drain contact hole on the thin film transistor through a fourth mask process, the drain contact hole exposing the drain electrode; and forming a pixel electrode connected to the drain electrode through the drain contact hole and including first and second pixel electrode patterns through a fifth mask process, wherein the first common electrode pattern has a rectangular ring shape including corner portions, wherein the second common electrode pattern and the second pixel electrode pattern have a spiral shape.

In another aspect of the present invention, a method of fabricating an array substrate for an in-plane switching liquid crystal display device includes: forming a gate line having a gate electrode, a common line parallel to and spaced apart from the gate line, a common electrode extending from the common line and including first and second common electrode patterns on a substrate through a first mask process; forming a gate insulating layer on the gate line, the common line and the common electrode; forming a data line crossing the gate line to define a pixel region, a source electrode extending from the data line, a drain electrode spaced apart from the source electrode and a semiconductor layer corresponding to the data line, the source electrode, the drain electrode on the gate insulating layer through a second mask process, the semiconductor layer being exposed between the source and drain electrodes, the gate electrode, the semiconductor layer, the source electrode and the drain electrode constituting a thin film transistor; forming a passivation layer having a drain contact hole on the thin film transistor through a third mask process, the drain contact hole exposing the drain electrode; and forming a pixel electrode connected to the drain electrode through the drain contact hole and including first and second pixel electrode patterns through a fourth mask process, wherein the first common electrode pattern has a rectangular shape including corner portions, wherein the second common electrode pattern and the second pixel electrode pattern have a spiral shape.

In a further aspect of the present invention, a method of fabricating an array substrate for an in-plane switching liquid crystal display device includes forming a gate line having a gate electrode and a common line parallel to and spaced apart from the gate line on a substrate; forming a gate insulating layer on the gate line and the common line; forming a data line crossing the gate line and defining a pixel region, a source electrode extending from the data line, a drain electrode spaced apart from the source electrode, a pixel connecting line connected to the drain electrode, and a semiconductor layer corresponding to the data line, the source electrode and the drain electrode, the semiconductor layer being exposed between the source and drain electrodes, the gate electrode, the semiconductor layer, the source electrode and the drain electrode constituting a thin film transistor; forming a passivation layer on the thin film transistor, the passivation layer having a first contact hole exposing the common line and a second contact hole exposing the pixel connecting line; forming a plurality of common and pixel electrodes on the passivation layer, wherein the plurality of common and pixel electrodes are formed of concentric rings, the common electrodes connected to the common line through the first contact hole, and the pixel electrode connected to the pixel connecting line through the second contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate an embodiment of the present invention and together with the description serve to explain the principles of that invention.

DETAILED DESCRIPTION OF THE PREFERRED EMBODIMENTS

Reference will now be made in detail to a preferred embodiment of the present invention, examples of which are shown in the accompanying drawings. Wherever possible, similar reference numbers will be used throughout the drawings to refer to the same or similar parts.

Figure 1:
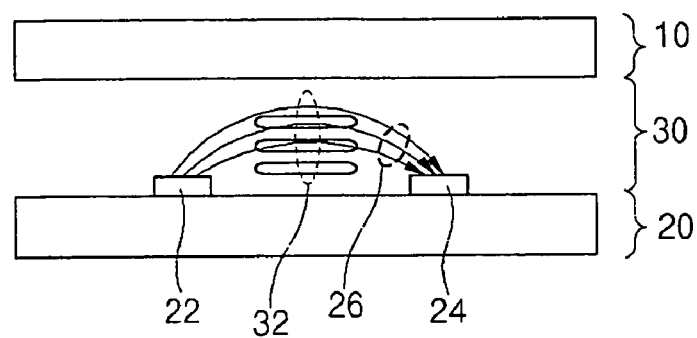
FIG. 1 is a cross-sectional view illustrating a concept of a related art IPS-LCD panel.
Figure 2:
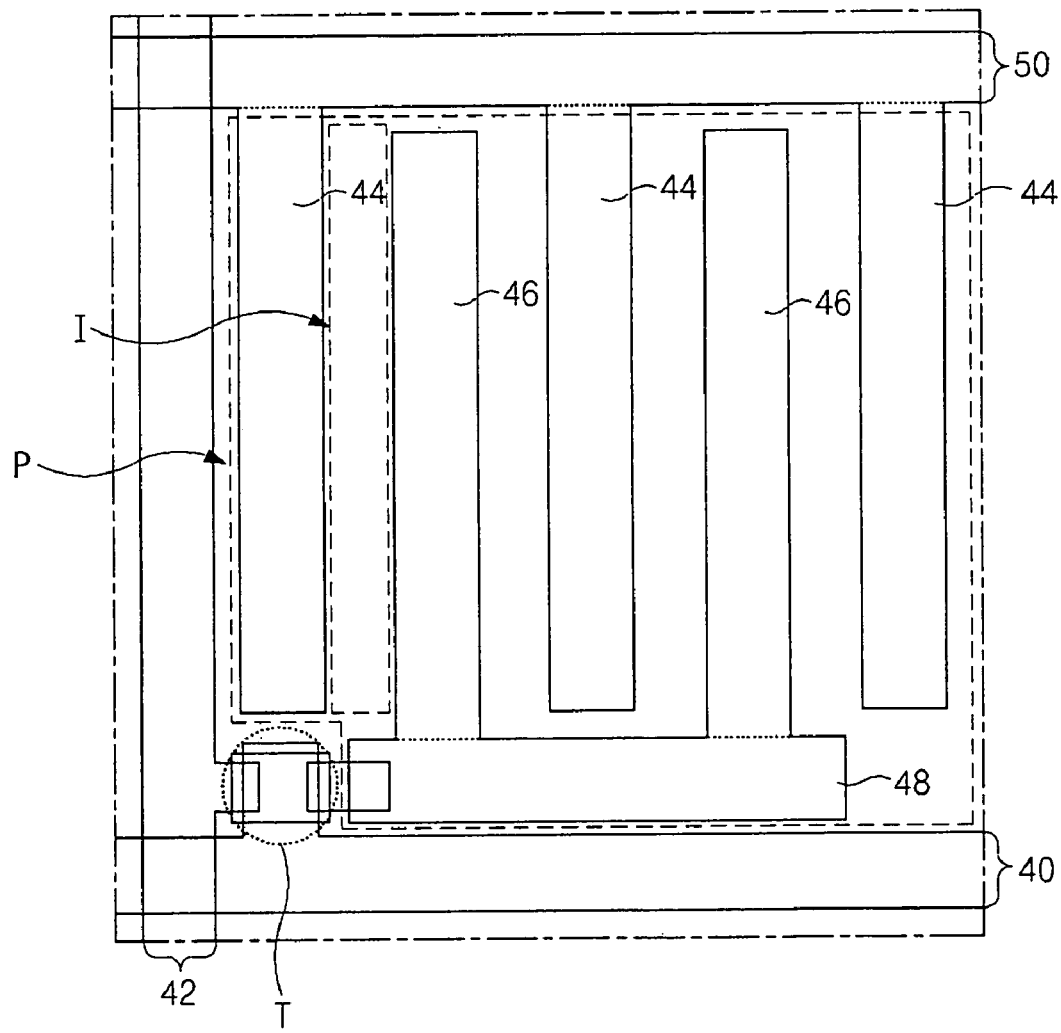
FIG. 2 is a plan view illustrating one pixel of an array substrate according to a related art PS-LCD device.
Figure 3:
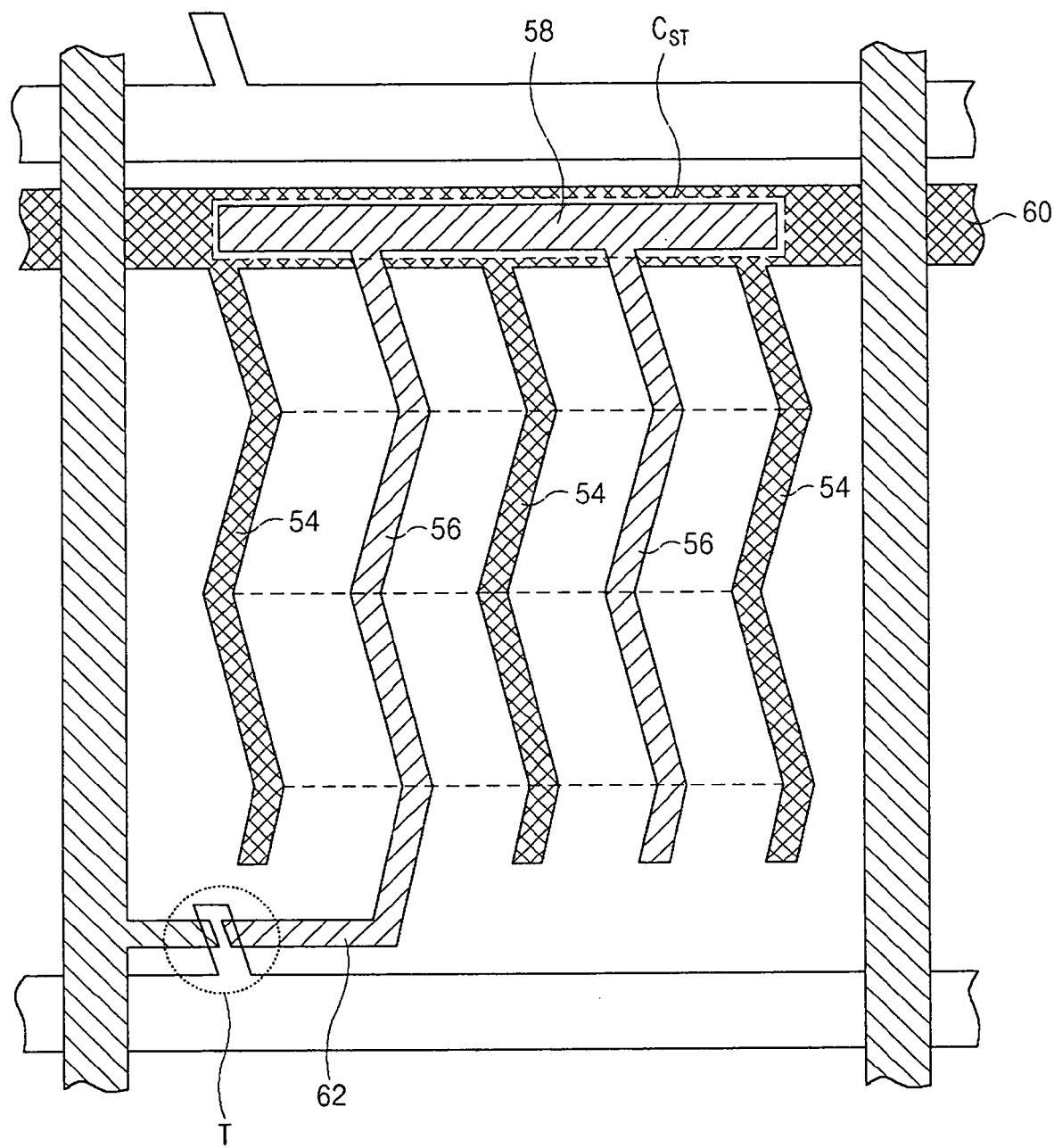
FIG. 3 is a plan view of an array substrate having multiple domains according to another related art IPS-LCD device.
Figure 4:
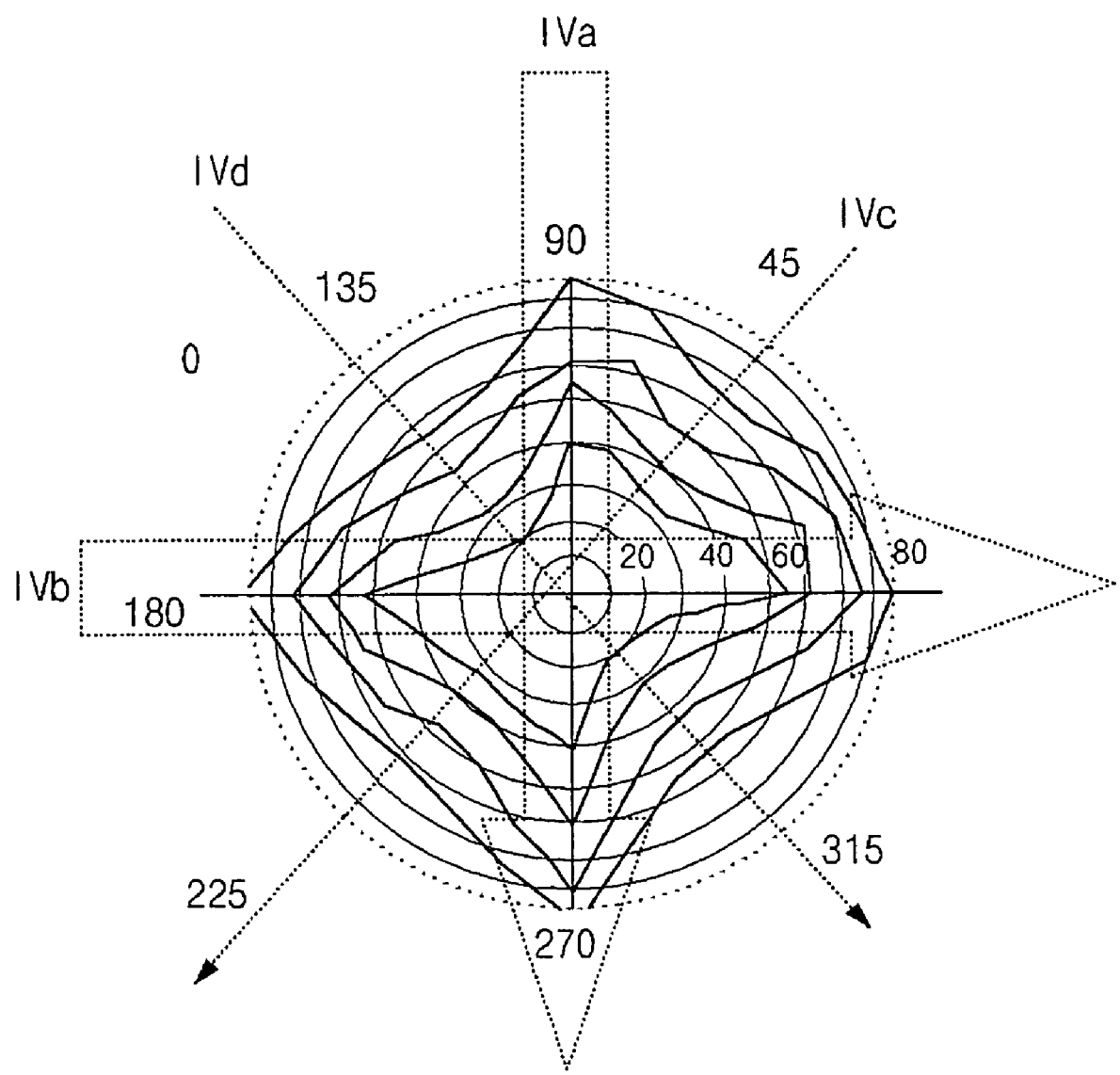
FIG. 4 is a graph illustrating a viewing angle of the IPS-LCD device having the zigzag structure shown in FIG. 3.
Figure 5:
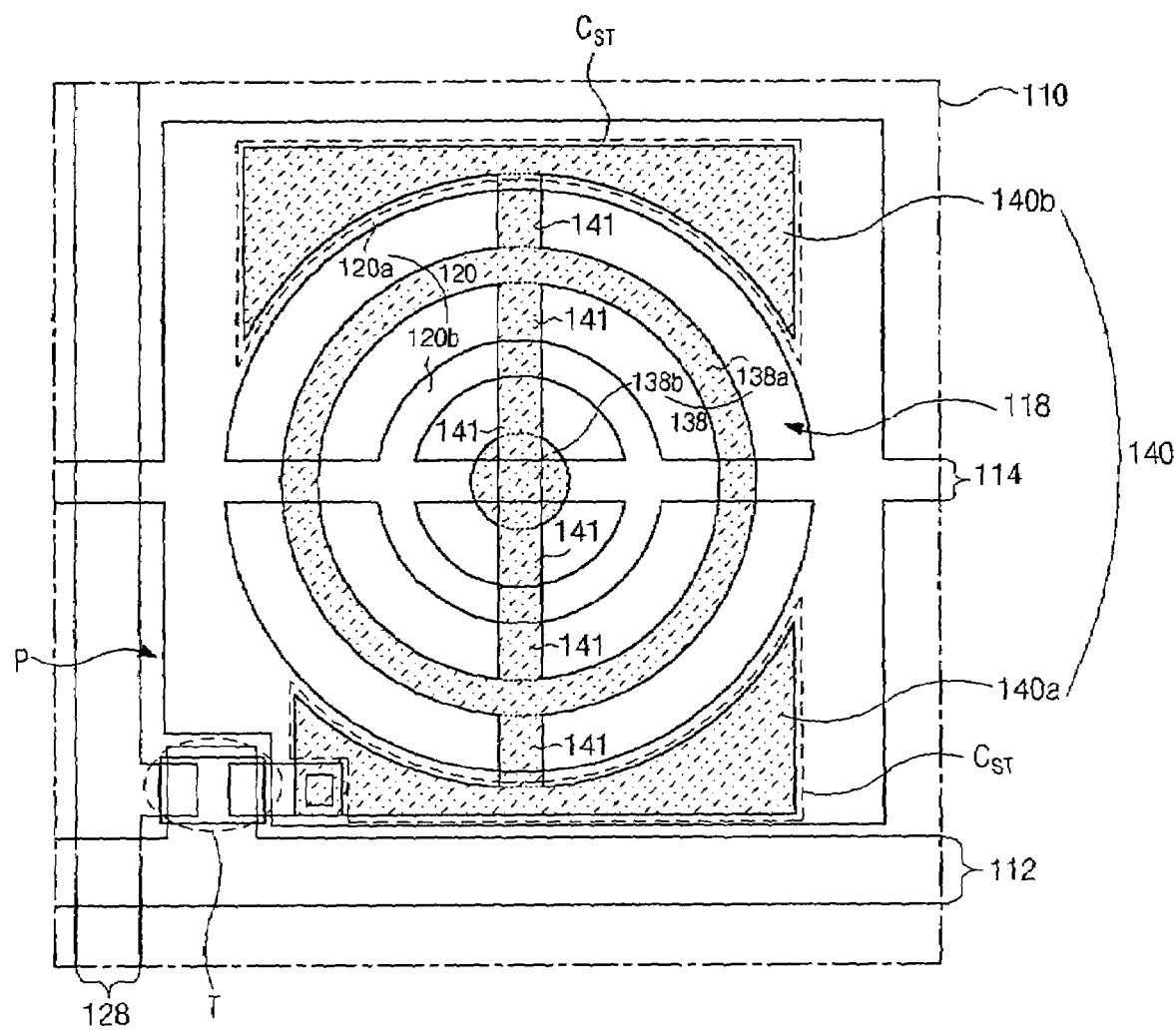
FIG. 5 is a plan view illustrating an array substrate for an IPS-LCD device according to a first embodiment of the present invention.

FIG. 5 is a plan view illustrating an array substrate for an IPS-LCD device according to a first embodiment of the present invention. In the first embodiment of the present invention, a common electrode and a pixel electrode are both configured to have a curved shape, such as a circular shape. As shown in FIG. 5, gate lines 112 are transversely arranged across the figure and data lines 128 are disposed substantially perpendicular to the gate lines 112. Pairs of gate and data lines 112 and 128 define a pixel region "P" on an array substrate 110 and both a pixel electrode 138 and a common electrode 120 are formed in the pixel region "P." A thin film transistor (TFT) "T" is disposed near each crossing of the gate line 112 and data line 128. Since the pixel electrode 138 and the common electrode 120 can have a circular shape, directors of liquid crystal molecules are the same in all directions and a color inversion along any angle is prevented.

A common line 114 is formed to be parallel with and spaced apart from the gate line 112. The common electrode 120 extends from the common line 114 and includes a first common electrode pattern 120a adjacent to sides of the pixel region "P." A substantially annular shaped open region 118 is formed within the common electrode pattern 120a. A second common electrode pattern 120b is formed within the substantially annular shaped open region 118 of the pixel region "P." The first common electrode pattern 120a is connected to the common line 114. Moreover, the second common electrode pattern 120b can be shaped like a ring on the common line 114. The common line 114 corresponds to and crosses a diametric line of the ring-shaped second common electrode pattern 120b and the substantially annular shaped open region 118.

A capacitor electrode 140 is formed in an area where the first common electrode pattern 120a is disposed such that the capacitor electrode 140 overlaps the first common electrode pattern 120a and constitutes a storage capacitor "$C_{ST}$" with the overlapped portions of the first common electrode pattern 120a. The capacitor electrode 140 includes a first capacitor electrode pattern 140a and a second capacitor electrode pattern 140b, respectively, in bottom and top portions of the pixel region "P." The first capacitor electrode 140a is connected to the second capacitor electrode 140b through a pixel connecting line 141 and the second capacitor electrode 140b is connected to the TFT "T."

The pixel electrode 138 includes first pixel electrode pattern 138a and second pixel electrode pattern 138b. The first pixel electrode pattern 138a having a ring shape is disposed between the first common electrode pattern 120a and second common electrode pattern 120b. The second pixel electrode pattern 138b having a circular shape is disposed inside the ring-shaped second common electrode pattern 120b. The pixel connecting line 141 is vertically disposed through the middle of the pixel region "P" and connects the first capacitor electrode pattern 140a and second capacitor electrode pattern 140b. Further, the pixel connecting line 141 also connects the first pixel electrode pattern 138a to the second pixel electrode pattern 138b. Accordingly, the pixel electrode 138, the capacitor electrode 140 and the pixel connecting line 141 may be formed as one pattern in the same patterning process. Thus, as shown in FIG. 5, there are concentric rings of pixel and common electrode patterns.

In the first embodiment illustrated in FIG. 5, the pixel region "P" has a multi-domain structure including four domains separated by the pixel connecting line 141 and the common line 114. To prevent reduction of a lateral electric field between the first common electrode pattern 120a and the first pixel electrode pattern 138a, the capacitor electrode 140 may be formed to have a smaller area than the first common electrode pattern 120a so as to not overlap a boundary portion of the first common electrode pattern 120a. Moreover, since aperture areas between the common electrode 120 and pixel electrode 138 have a circular structure, the liquid crystal directors become the same in all directions such that the color shift can be prevented. Furthermore, the image quality of the IPS-LCD device is improved, and the IPS-LCD device has much wider viewing angle. Although FIG. 5 shows common electrode 120 including two common electrode patterns 120a and 120b and the pixel electrode 138 including two pixel electrode patterns 138a and 138b, the common electrode and the pixel electrode may have more than two common electrode patterns and more than two pixel electrode patterns, respectively.

Figure 6:
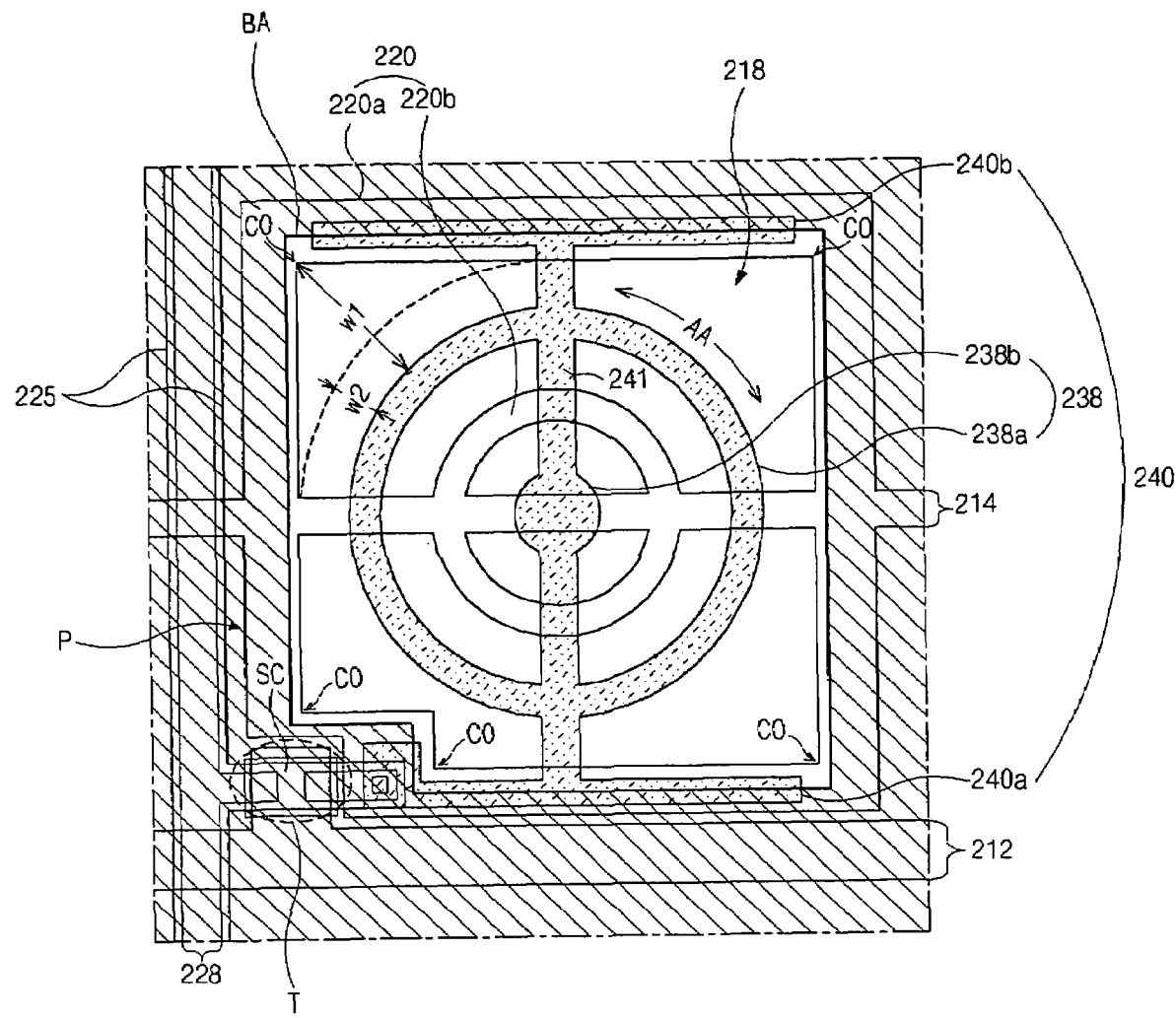
FIG. 6 is a plan view illustrating an array substrate for an IPS-LCD device according to a second embodiment of the present invention.

FIG. 6 is a plan view illustrating an array substrate for an IPS-LCD device according to a second embodiment of the present invention. As shown in FIG. 6, a gate line 212 is transversely arranged across the figure and a data line 228 is disposed substantially perpendicular to the gate line 212. The gate line 212 and data line 228 define a pixel region "P" on an array substrate. A semiconductor layer 225 is formed to have a structure corresponding to the data line 228. A thin film transistor (TFT) "T" is connected to the gate line 212 and the data line 228, and the semiconductor layer 225 of the TFT "T" constitutes a semiconductor region "SC."

A common electrode 220, including first electrode pattern 220a and second common electrode pattern 220b, is formed in the pixel region "P." A substantially rectangular shaped open region 218 is formed within the common electrode pattern 220a. A second common electrode pattern 220b has a ring shape and is formed within the substantially rectangular shaped open region 218. The common electrode 220 is connected to a common line 214 parallel with and spaced apart from the gate line 212.

A capacitor electrode 240 including first capacitor electrode pattern 240a and second capacitor electrode pattern 240b is connected to the TFT "T." The capacitor electrode 240 is formed in an area where the first common electrode pattern 220a is disposed such that the capacitor electrode 240 overlaps the first common electrode pattern 220a and constitutes a storage capacitor with the overlapped portions of the first common electrode pattern 220a. The first capacitor electrode pattern 240a and the second capacitor electrode pattern 240b are disposed in bottom and top portions of the pixel region "P," respectively.

A pixel electrode 238, including first pixel electrode pattern 238a and second pixel electrode pattern 238b, are connected to the capacitor electrode 240. The first pixel electrode pattern 238a having a ring shape is disposed between the first common electrode pattern 220a and second common electrode pattern 220b. The second pixel electrode pattern 238b having a circular shape is disposed inside the ring-shaped second common electrode pattern 220b. Thus, as shown in FIG. 6, there are concentric rings of pixel and common electrode patterns.

In the second embodiment illustrated in FIG. 6, to generate a lateral electric field between the first common electrode pattern 220a and the first pixel electrode pattern 238a, the capacitor electrode 240 may be formed to have a smaller area than the first common electrode pattern 220a and does not overlap a boundary portion of the first common electrode pattern 220a. Moreover, the first capacitor electrode pattern 240a and second capacitor electrode pattern 240b face each other and are spaced apart from each other. The first capacitor electrode pattern 240a and second capacitor electrode pattern 240b have a substantially rectangular shape and are parallel to each other. The first capacitor electrode pattern 240a and second capacitor electrode pattern 240b are connected to the first pixel electrode pattern 238a and second pixel electrode pattern 238b through a pixel connecting line 241.

An aperture area "AA" may be defined by a space between the first common electrode pattern 220a and the first pixel electrode pattern 238a. Unlike the first embodiment, the first common electrode pattern 220a has a substantially rectangular shaped open region 218 such that the first common electrode pattern 220a has corner portions "CO." Thus, a first width "w1" of the aperture area "AA" at the corner portion "CO" is greater than a second width "w2" of the aperture area at another portion. Accordingly, the aperture area "AA" is larger than in a device where the common electrode has a substantially annular shaped open region therein. Moreover, a black matrix area "BA" where a black matrix may be formed can have an opening corresponding to the substantially rectangular shaped open region 218 within the first common electrode pattern 220a. Since the black matrix area (BA) is reduced, an aperture ratio of the IPS-LCD device is improved. The black matrix may be formed over the array substrate where the common electrode 220 and the pixel electrode 238 are formed or may be formed over a color filter substrate facing and spaced apart from the array substrate.

Figure 7A:
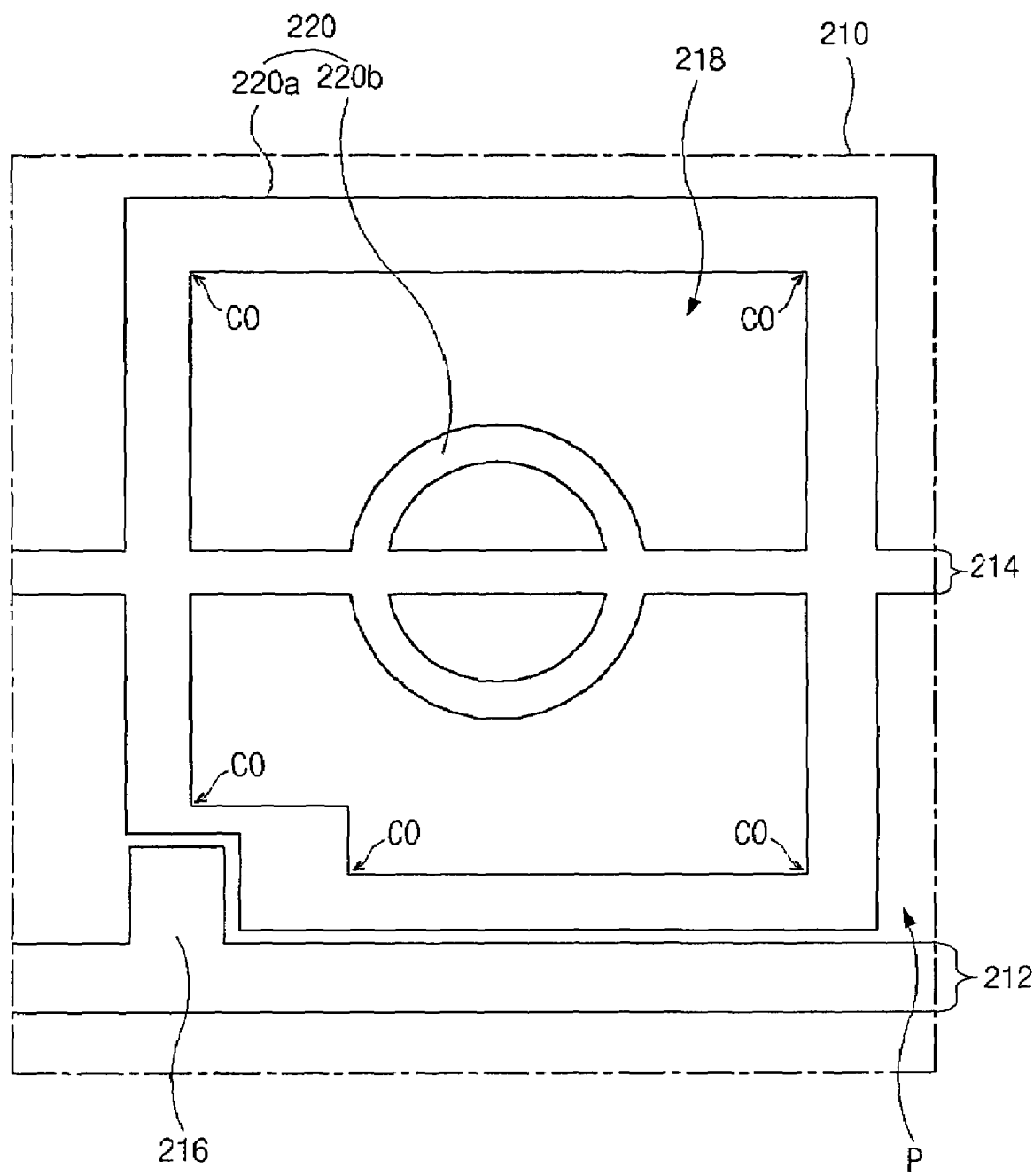
FIGS. 7A to 7D are plan views illustrating a four mask process of fabricating an array substrate for an IPS-LCD device according to a second embodiment of the present invention.

Unlike a conventional twisted nematic (TN) mode LCD device, the black matrix area of the present invention includes a region corresponding to the gate line, the data line and the first common electrode pattern and a margin for overlapping the first common electrode. Thus, the opening of the black matrix area is slightly greater than the open portion of the first common electrode pattern. Since the black matrix area is designed to correspond to the opening region within the first common electrode pattern, the aperture ratio may be improved by changing the size of the open region FIGS. 7A to 7D are plan views illustrating a four mask process of fabricating an array substrate for an IPS-LCD device according to a second embodiment of the present invention. As shown in FIG. 7A, a gate line 212 and a common line 214 are formed on a substrate 210 through a first mask process. At the same time, a gate electrode 216 connected to the gate line 212 and a common electrode 220 connected to the common line 214 may be formed. The common electrode 220 includes first common electrode pattern 220a and second common electrode pattern 220b. The first common electrode pattern 220a includes an open portion 218 having corner portions "CO" within the pixel region "P." The second common electrode pattern 220b is a ring shape positioned within the substantially rectangular shaped open region 218. The area of the substantially rectangular shaped open region 218 is enlarged due to the corner portions "CO," thereby aperture ratio improved.

Figure 7B:
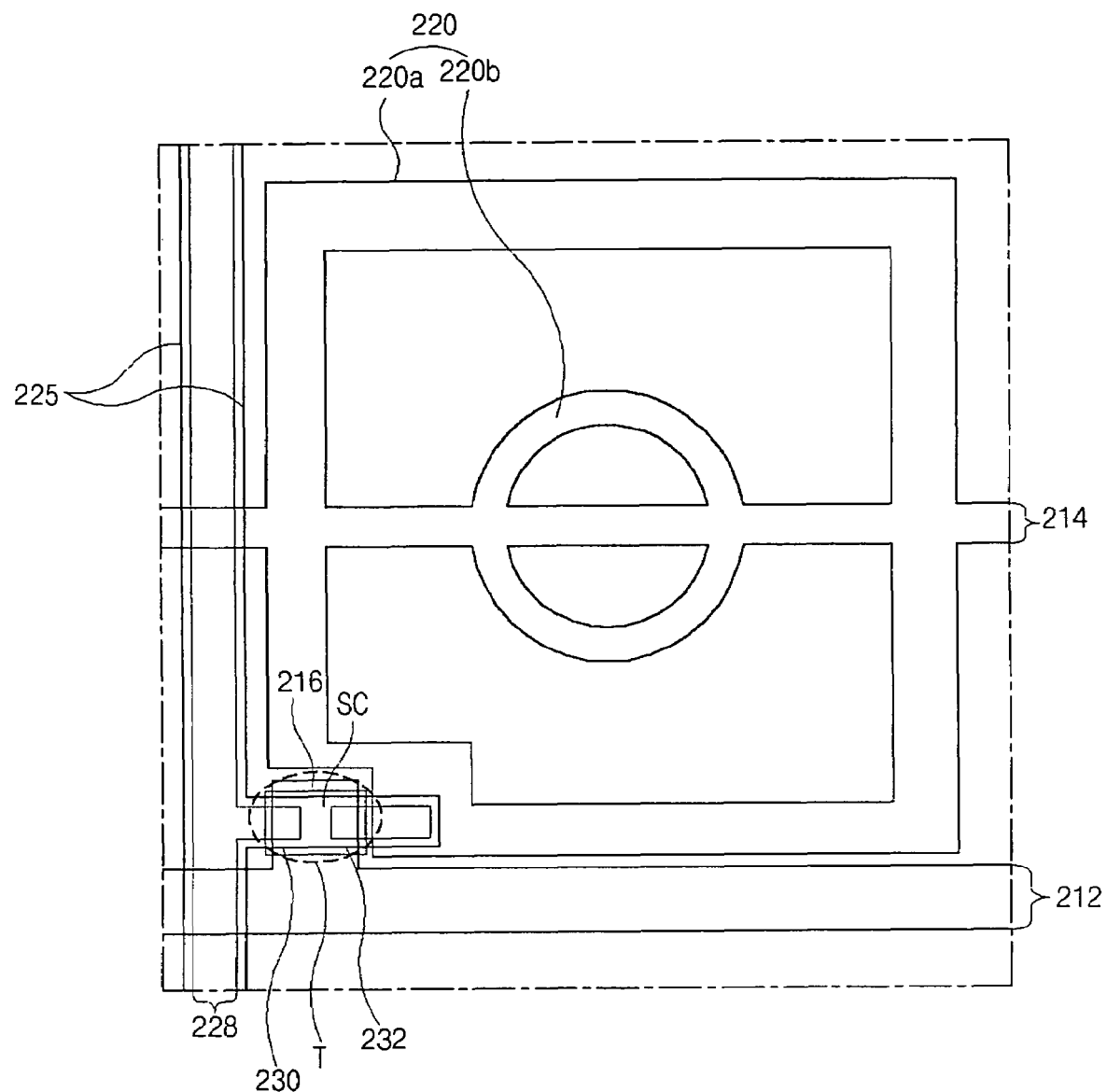

As shown in FIG. 7B, after forming a gate insulating layer (not shown) on the gate line 212 and the common line 214, a semiconductor layer 225 and a data line 228 are subsequently formed on the gate insulating layer through a second mask process. The semiconductor layer 225 may be multiple layers including an intrinsic amorphous silicon layer and impurity-doped amorphous silicon layer. The data line 228 may include a metallic material. At the same time, a source electrode 230 overlapping the gate electrode 216 and extending from the data line 228 along with a drain electrode 232 spaced apart from the source electrode 230 are formed. A portion of the semiconductor layer 225 corresponding to the source electrode 230 and drain electrode 232 constitutes a semiconductor region "SC."

The semiconductor region "SC" may be exposed between the source electrode 230 and drain electrode 232 through an exposure process using a diffraction mask. Although not shown in figures, after sequentially forming an intrinsic amorphous silicon layer, an impurity-doped amorphous silicon layer and a metallic material layer on the gate insulating layer, a photoresist (PR) layer having a first thickness is formed on the metallic material layer. After disposing a diffraction mask having transmissive, diffractive and shielding regions over the PR layer, the PR layer is irradiated through the diffraction mask. For example, when a negative type PR layer where exposed portion remains is used, the exposed semiconductor region corresponds to the diffractive region of the diffraction mask and the source and drain electrodes correspond to the transmissive region of the diffraction mask. After developing the exposed PR layer, a first PR pattern having a first thickness on the source and drain electrodes and a second thickness on the exposed semiconductor region is obtained. After sequentially etching the intrinsic amorphous silicon layer, the impurity-doped amorphous silicon layer and the metallic material layer using the first PR pattern as an etching mask, the first PR pattern becomes a second PR pattern such that portions having the second thickness are removed through an ashing step. The semiconductor layer is etched using the second PR pattern as an etching mask. Thus, the semiconductor region "SC" may be exposed between the source and drain electrodes 230 and 232 through an exposure process using a diffraction mask. The gate electrode 216, the semiconductor region "SC," the source electrode 230 and the drain electrode 232 constitute a thin film transistor (TFT) "T."

Figure 7C:
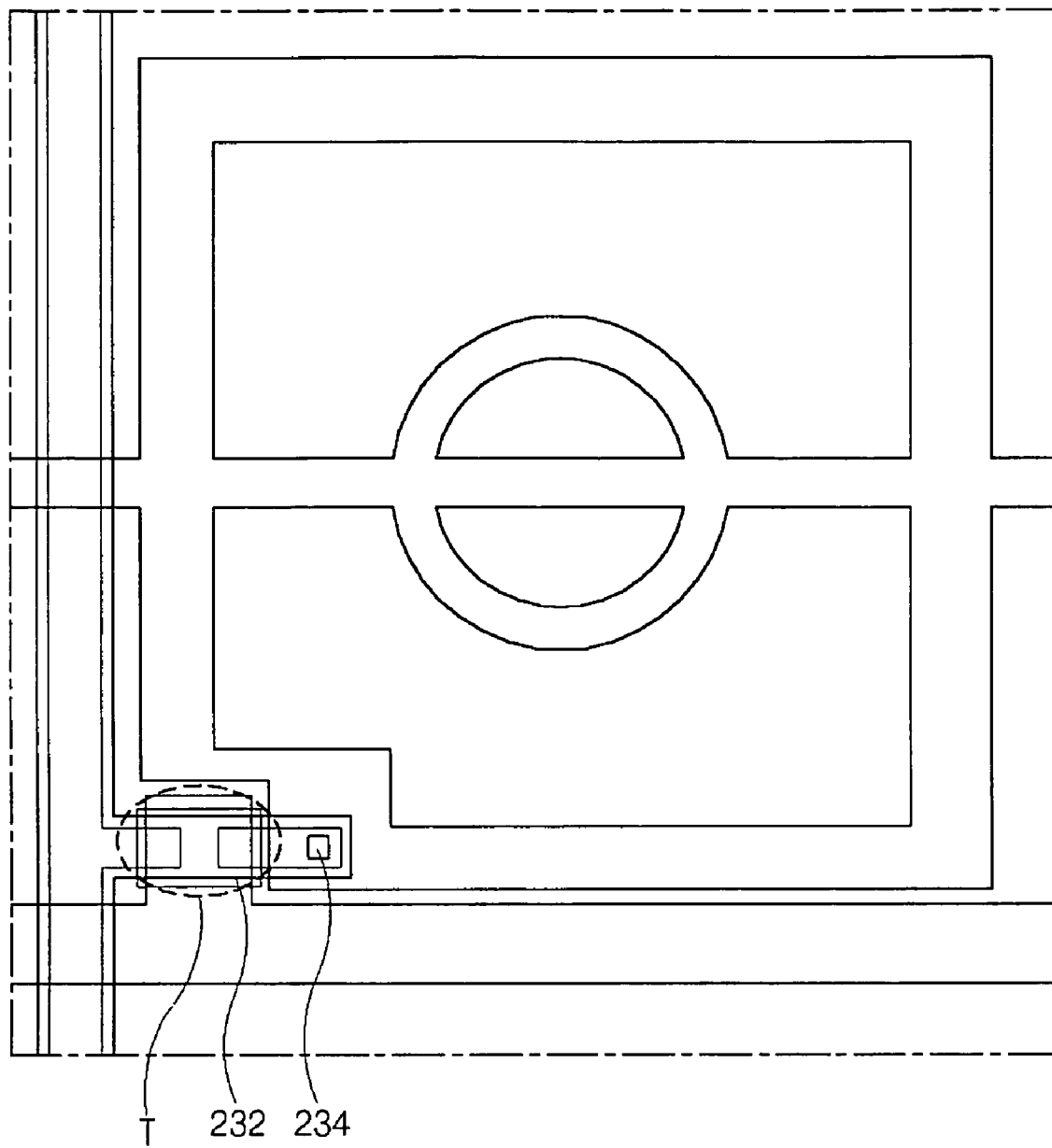

As shown in FIG. 7C, a passivation layer (not shown) having a drain contact hole 234 is formed on the TFT "T" through a third mask process. The drain electrode 232 is exposed through the drain contact hole 234.

Figure 7D:
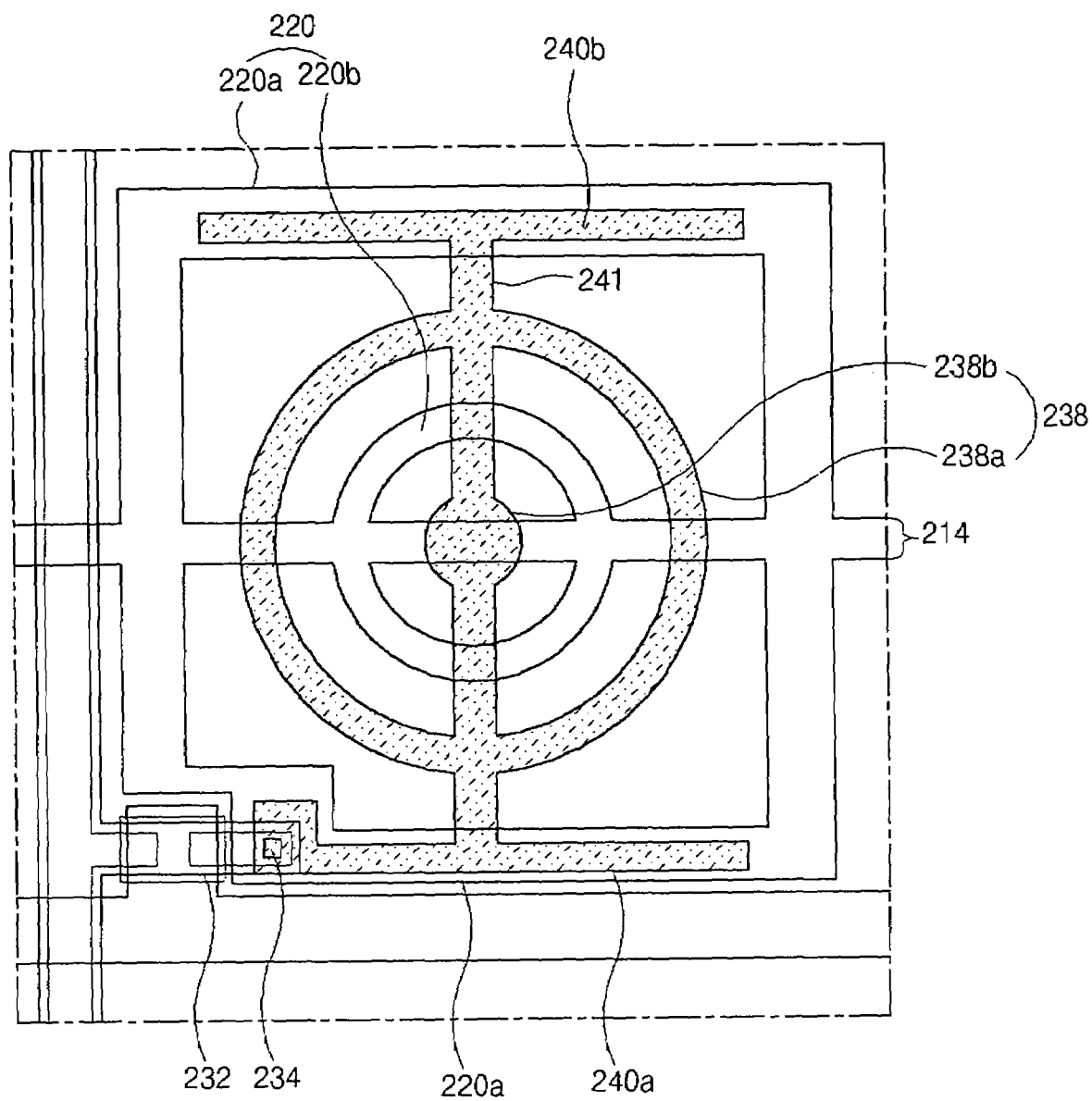

As shown in FIG. 7D, a pixel electrode 238 connected to the drain electrode 232 through the drain contact hole 234 is formed on the passivation layer (not shown). At the same time, a capacitor electrode 240, including first capacitor electrode pattern 240a and second capacitor electrode pattern 240b, and a pixel connecting line 241 are formed on the passivation layer (not shown). The pixel electrode 238 includes a first pixel electrode pattern 238a and a second pixel electrode pattern 238b. The capacitor electrode 240 includes first capacitor electrode pattern 240a and second capacitor electrode pattern 240b.

The first pixel electrode pattern 238a having a ring shape and extending from the pixel connecting line 241 is disposed between the first electrode pattern 220a and second common electrode pattern 220b. The second pixel electrode pattern 238b having a circular shape is disposed inside the ring-shaped second common electrode pattern 220b. The first capacitor electrode pattern 240a contacts the drain electrode 232 and overlaps the first common electrode pattern 220a. The second capacitor electrode pattern 240b faces into the first capacitor electrode pattern 240a and also overlaps the first common electrode pattern 220a. The first electrode pattern 240 and second capacitor electrode pattern 240b are disposed in bottom and top portions of the pixel region "P," respectively. The pixel connecting line 241 connects the first capacitor electrode 240 and second capacitor electrode 240b, and crosses the common line 214. The first pixel electrode pattern 238a and second pixel electrode pattern 238b, the first capacitor electrode pattern 240a and second capacitor electrode pattern 240b, and the pixel connecting line 241 may be formed as a single pattern using a single patterning process.

To prevent reduction of a lateral electric field between the first common electrode pattern 220a and the first pixel electrode pattern 238a, the first capacitor electrode pattern 240a and second capacitor electrode pattern 240b may be formed to have a smaller area than the first common electrode pattern 220a so as to not overlap a boundary portion of the first common electrode pattern 220a. In other words, the first capacitor electrode pattern 240a and second capacitor electrode pattern 240b may be formed inside of the first common electrode pattern 220a. In the alternative, the common electrode and the pixel electrode can have a spiral shape that may be connected to the common line and the capacitor electrode, respectively, without an additional connecting pattern.

Figure 8:
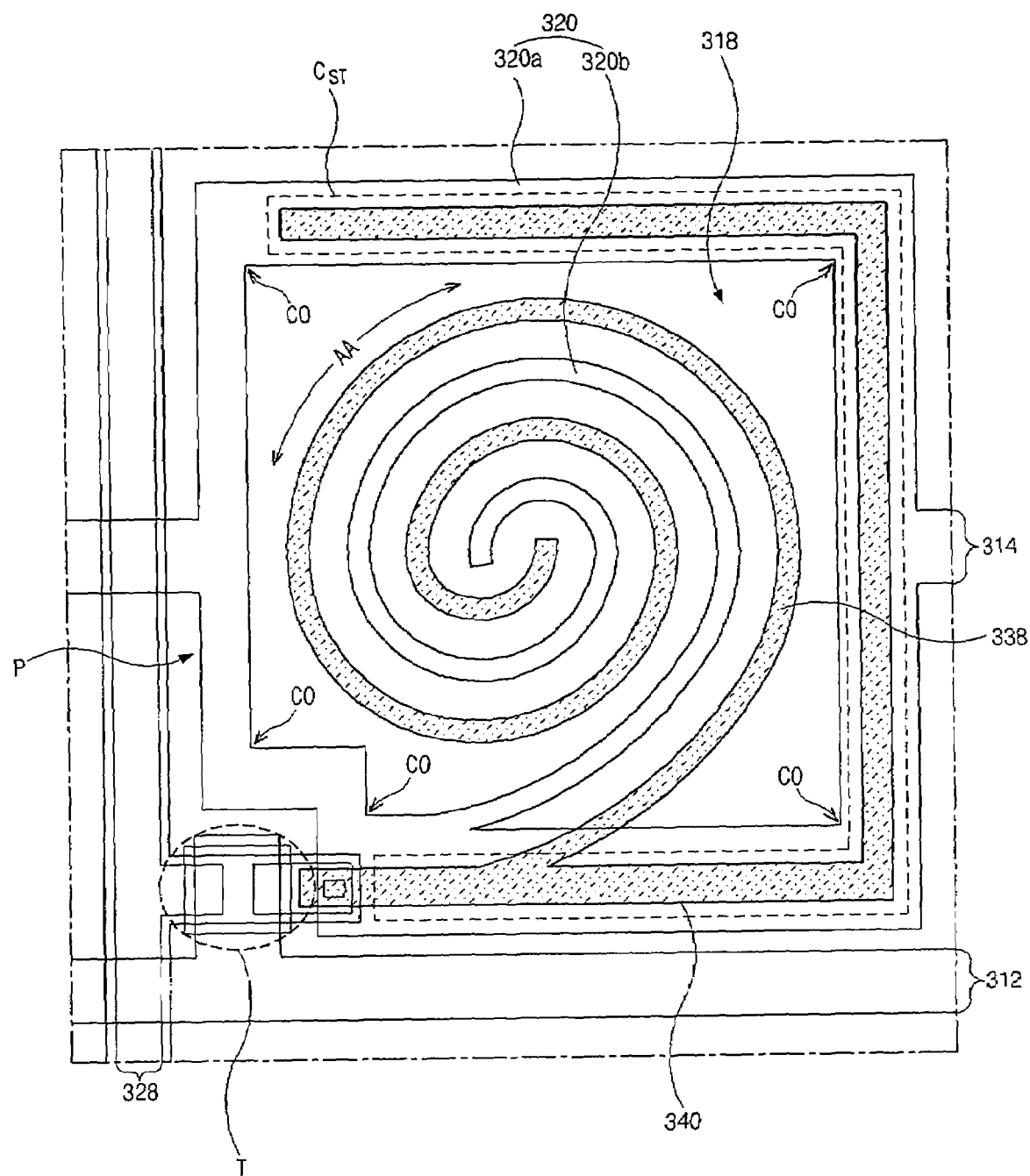
FIG. 8 is a plan view of an array substrate for an IPS-LCD device according to a third embodiment of the present invention.

FIG. 8 is a plan view of an array substrate for an IPS-LCD device according to a third embodiment of the present invention. As shown in FIG. 8, a gate line 312 is transversely arranged across the figure and a data line 328 is disposed substantially perpendicular to the gate line 312. The gate line 312 and data line 328 define a pixel region "P" on an array substrate. A semiconductor layer 325 is formed to have a structure corresponding to the data line 328 and a thin film transistor (TFT) "T" is connected to the gate line 312 and the data line 328.

A common electrode 320 including first common electrode pattern 320 and second common electrode pattern 320b are formed in the pixel region "P." A substantially rectangular shaped open region 318 is formed within the first common electrode pattern 320a. The second common electrode pattern 320b has a spiral shape and extends from the first common electrode pattern 320a into the substantially rectangular shaped open region 318. The common electrode 320 is connected to an adjacent common electrode in a neighbor pixel region (not shown) through a common line 314.

A capacitor electrode 340 connected to the TFT "T" is formed to overlap the first common electrode pattern 320a and constitutes a storage capacitor "$C_{ST}$" with the overlapped portions of the first common electrode pattern 320a. A pixel electrode 338 having a spiral shape extends from the capacitor electrode 340. The pixel electrode 338 is intertwined with and spaced apart from the second common electrode pattern 320b.

In the third embodiment illustrated in FIG. 8, to generate a lateral electric field between the first common electrode pattern 320a and the pixel electrode 338, the capacitor electrode 340 may be formed to have a smaller area than the first common electrode pattern 320a and does not overlap a boundary portion of the first common electrode pattern 320a. Moreover, since the first common electrode pattern 320a has corner portions "CO," the aperture ratio is improved. In other words, an aperture area "AA" defined by a space between the first common electrode pattern 320a and the pixel electrode 338 is enlarged due to the corner portions in the first common electrode pattern 320a.

Figure 9A:
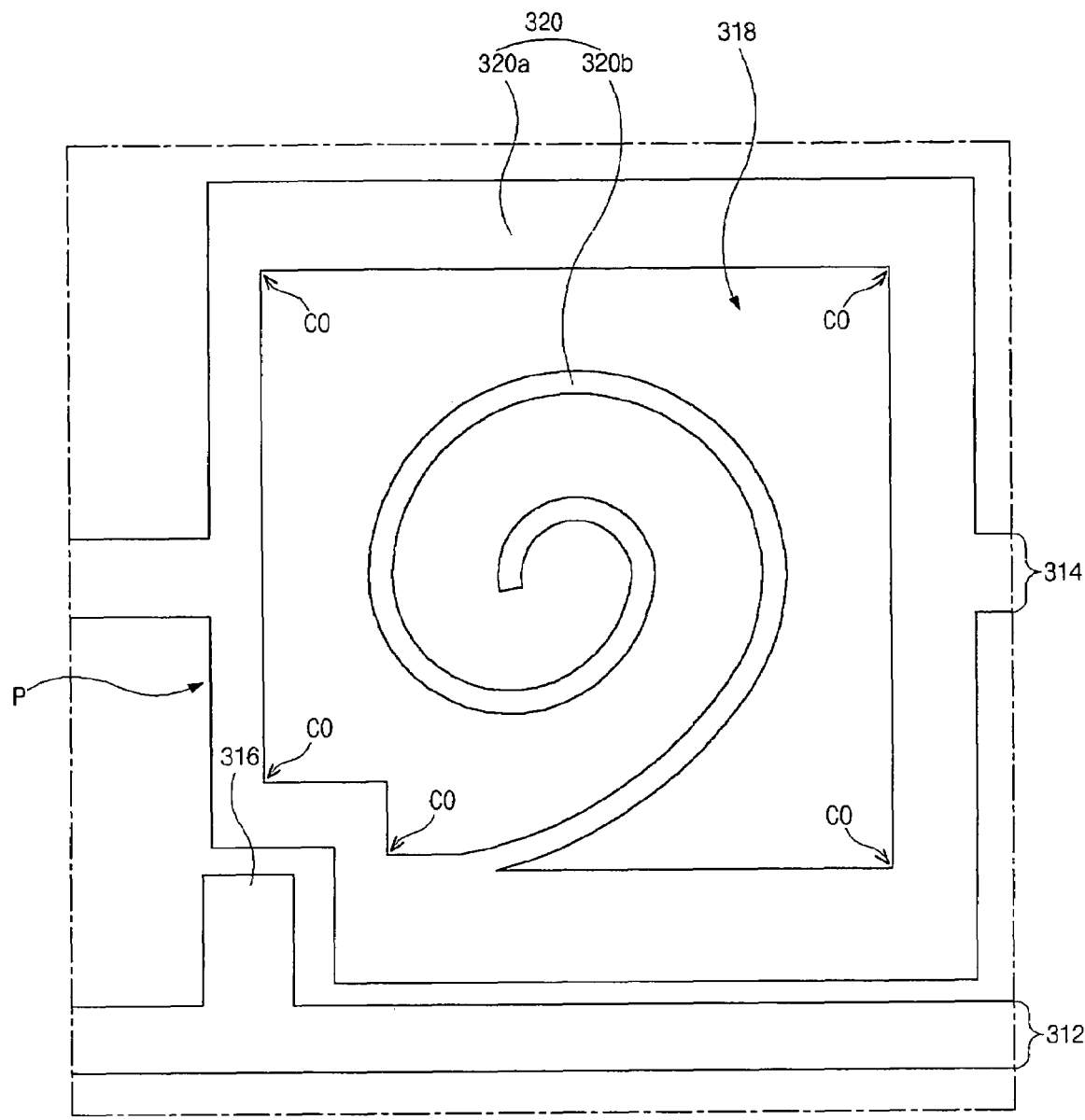
FIGS. 9A to 9D are plan views illustrating a four mask process of fabricating an array substrate for an IPS-LCD device according to a third embodiment of the present invention.

FIGS. 9A to 9D are plan views illustrating a four mask process of fabricating an array substrate for an IPS-LCD device according to a third embodiment of the present invention. As shown in FIG. 9A, a gate line 312 and a common electrode 320, including first common electrode pattern 320a and second common electrode pattern 320b, are formed on a substrate through a first mask process. At the same time, a gate electrode 316 connected to the gate line 312 and a common line 314 connecting the adjacent common electrodes 320 may be formed. The first common electrode pattern 320a has corner portions "CO" so as to form a substantially rectangular shaped open region 318. The first common electrode pattern 320a is adjacent to the boundary of the pixel region "P." The second common electrode pattern 320b has a spiral shape and is positioned within the substantially rectangular shaped open region 318. The second common electrode pattern 320b extends from the first common electrode pattern 320a. Since the first common electrode pattern 320a is configured to have corner portions "CO," the aperture ratio improved.

Figure 9B:
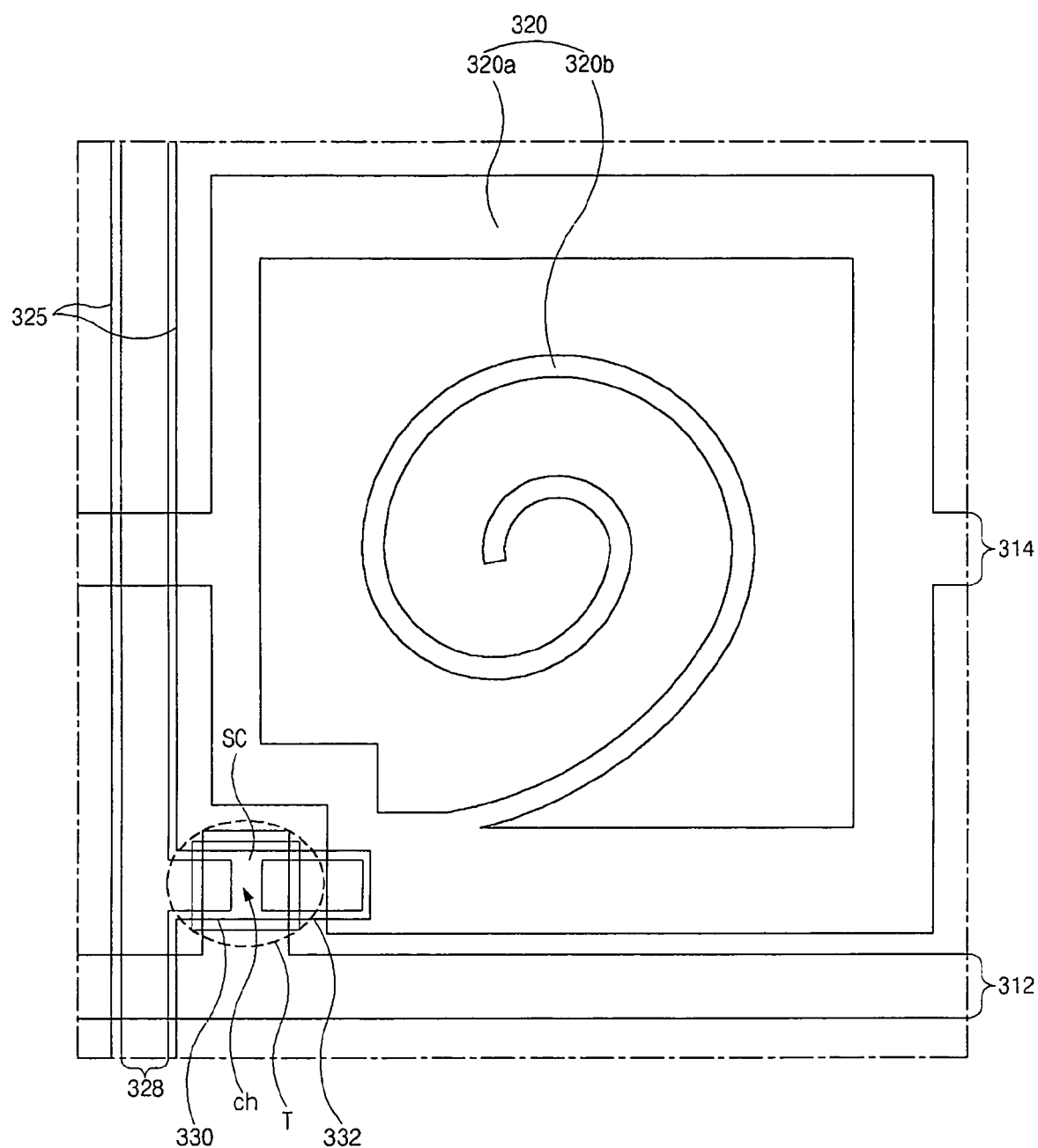

As shown in FIG. 9B, after forming a gate insulating layer (not shown) on the gate line 312 and the common electrode 320, a semiconductor layer 325 and a data line 328 are subsequently formed on the gate insulating layer through a second mask process. The semiconductor layer 325 may include multiple layers, such as an intrinsic amorphous silicon layer and impurity-doped amorphous silicon layer. The data line 328 may include a metallic material. At the same time, a source electrode 330 overlapping the gate electrode 316 and extending from the data line 328 and a drain electrode 332 spaced apart from the source electrode 330 are formed. A portion of the semiconductor layer 325, corresponding to the source electrode 330 and drain electrode 332, constitutes a semiconductor region "SC." The semiconductor region "SC" may be exposed between the source electrode 330 and drain electrode 332 through an exposure process using a diffraction mask and the exposed semiconductor region "SC" may be referred to as a channel region "ch." The gate electrode 316, the semiconductor region "SC," the source electrode 330 and the drain electrode 332 constitute a thin film transistor (TFT) "T."

Figure 9C:
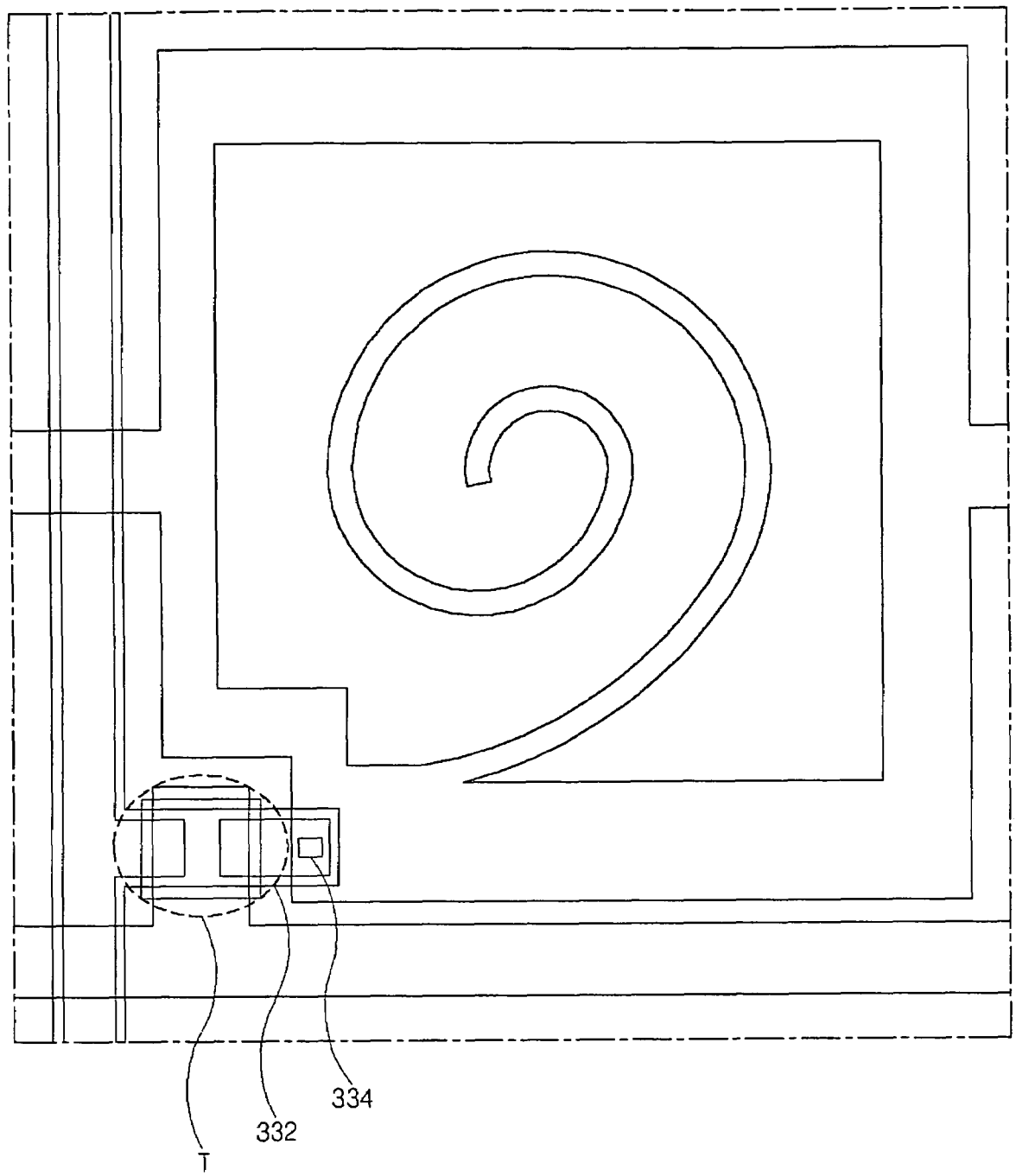

As shown in FIG. 9C, a passivation layer (not shown) having a drain contact hole 334 is formed on the TFT "T" through a third mask process. The drain electrode 332 is exposed through the drain contact hole 334.

Figure 9D:
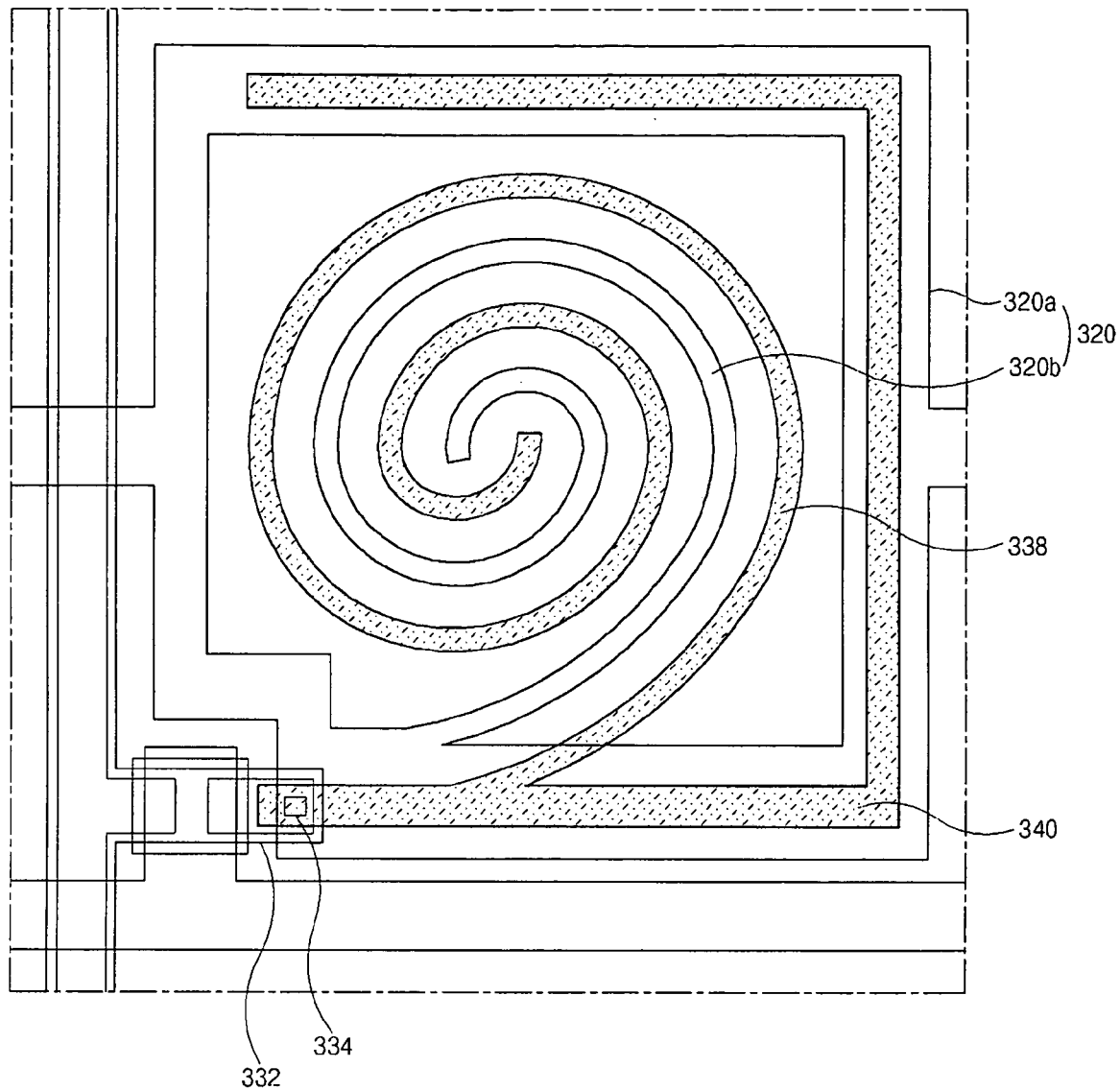

As shown in FIG. 9D, a pixel electrode 338 connected to the drain electrode 332 through the drain contact hole 334 and a capacitor electrode 340 are formed on the passivation layer (not shown). The pixel electrode 338 has a spiral shape and extends from the capacitor electrode 340. The pixel electrode 338 is intertwined with and is spaced apart from the second common electrode pattern 320b. The capacitor electrode 340 overlaps the first common electrode pattern 320a. To prevent reduction of a lateral electric field between the first common electrode pattern 320a and the pixel electrode 338, the capacitor electrode 340 may be formed to have a smaller area than the first common electrode pattern 320a so as to not overlap a boundary portion of the first common electrode pattern 320a. In other words, the capacitor electrode 340 may be formed inside of the first common electrode pattern 320a.

In another alternative, the IPS-LCD device may be fabricated using a lift-off process. In a lift-off process, after forming a photoresist (PR) pattern on a first layer, a second layer is formed on the PR pattern and the first layer. The second layer is patterned by removing a portion of the second layer on the PR pattern while the PR pattern is striped out. Accordingly, a desired second pattern is obtained.

FIGS. 10A to 10D are plan views showing a three mask process of fabricating an array substrate for an IPS-LCD device according to a fourth embodiment of the present invention. FIGS. 16A-16D are cross sectional views illustrating the process steps of forming the gate pad and corresponding to FIGS. 10A-10D, respectively. FIGS. 17A-26D are cross sectional views illustrating the process steps of forming the data pad and corresponding to FIGS. 10A-10D.

Figure 10A:
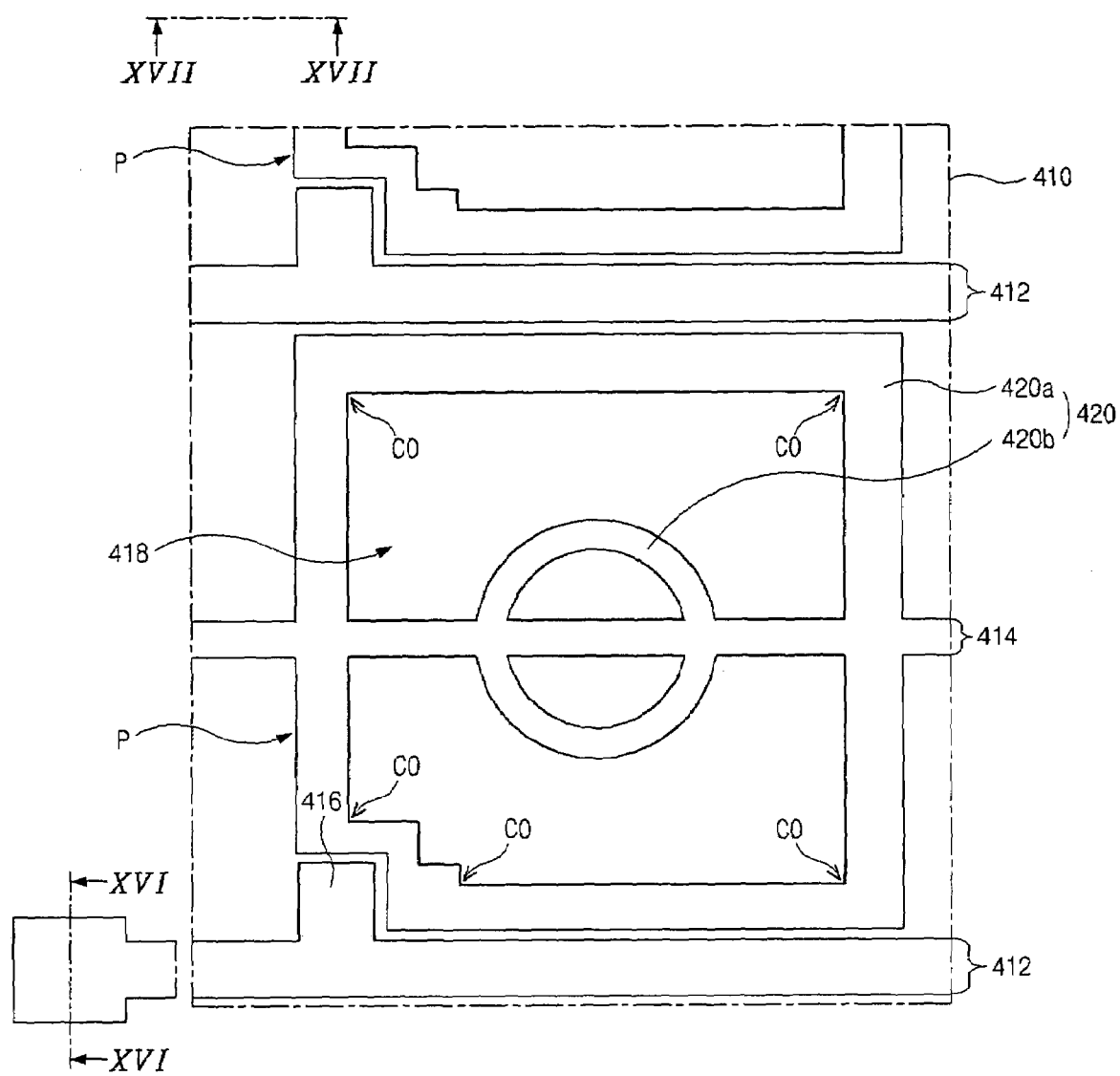
FIGS. 10A to 10D are plan views showing a three mask process of fabricating an array substrate for an IPS-LCD device according to a fourth embodiment of the present invention.
Figure 16A:
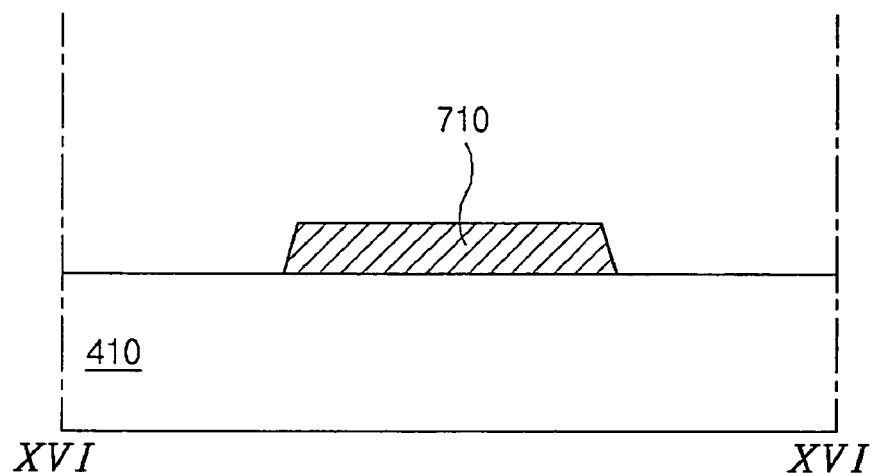
FIGS. 16A-16D are cross sectional views illustrating the process steps of forming the gate pad and corresponding to FIGS. 10A-10D, respectively.
Figure 17A:
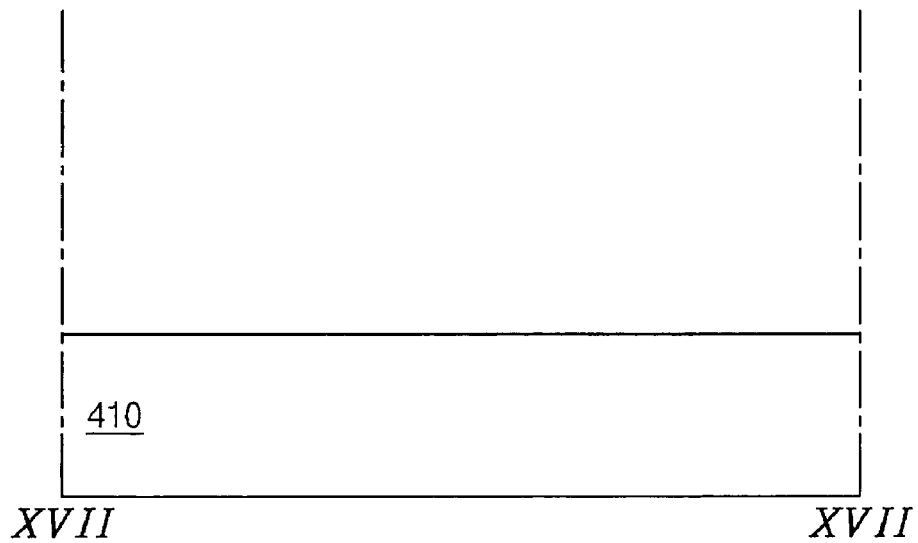
FIGS. 17A-17D are cross sectional views illustrating the process steps of forming the data pad and corresponding to FIGS. 10A-10D.

As shown in FIGS. 10A, 16A and 17A, a gate line 412 and a common line 414 are formed on a substrate 410 through a first mask process. At the same time, a gate electrode 416 connected to the gate line 412, a gate pad 710 connected to one end of the gate line 412 and a common electrode 420 connected to the common line 414 may be formed. The common electrode 420 includes first common electrode pattern 420a and second common electrode pattern 420b. A substantially rectangular shaped open region 418 is formed within the first common electrode pattern 420a. The second common electrode pattern 420b is a ring shape in the substantially rectangular shaped open region 418. Since the first common electrode pattern 420a has corner portions "CO," the aperture ratio is improved.

Figure 10B:
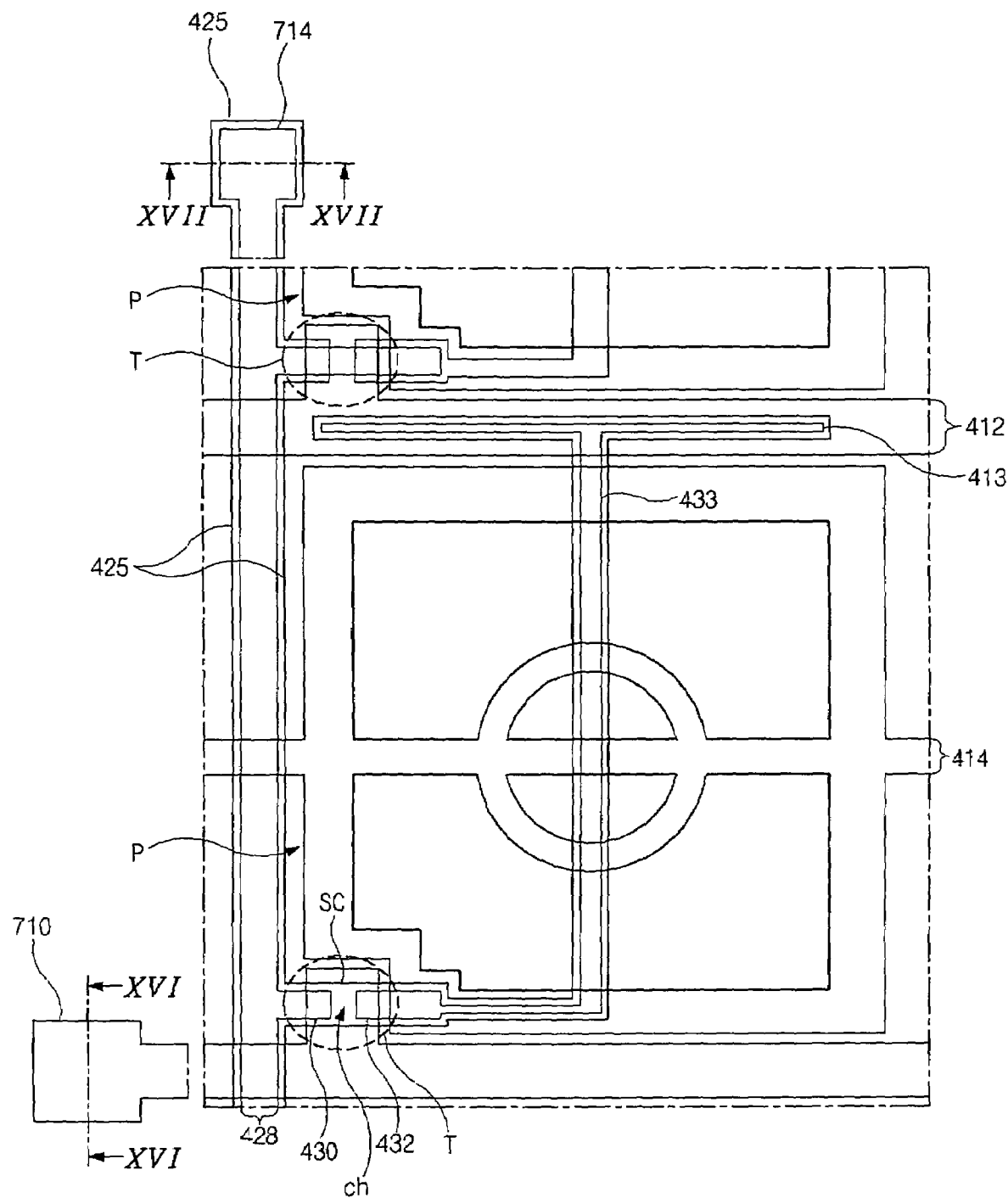
Figure 16B:
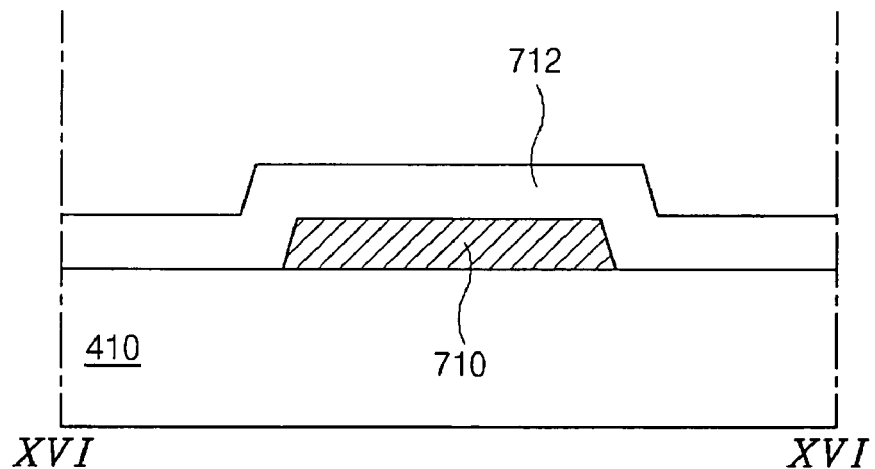
Figure 17B:
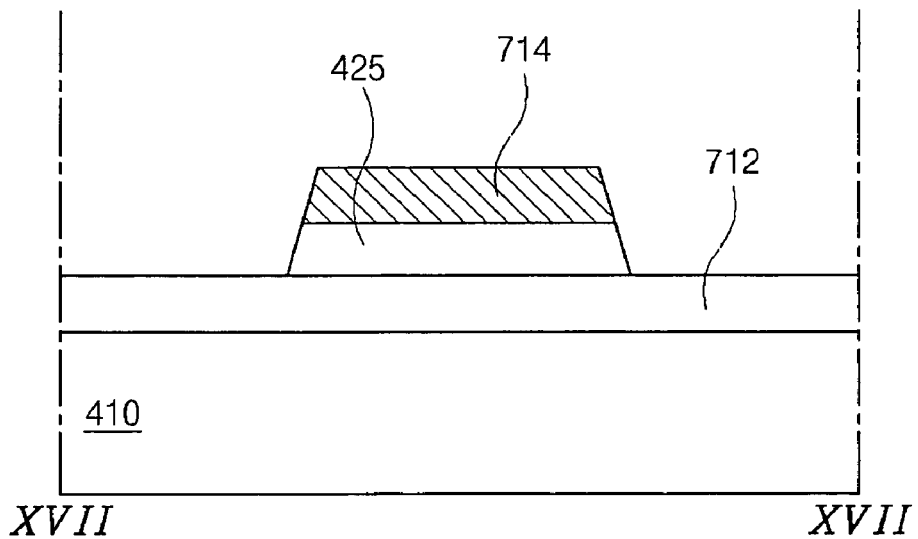

As shown in FIGS. 10B, 16B and 17B, after forming a gate insulating layer 712 on the gate line 412, the gate pad 710 and the common line 414, a semiconductor layer 425 and a data line 428 are subsequently formed on the gate insulating layer through a second mask process. The semiconductor layer 425 may include multiple layers including an intrinsic amorphous silicon layer and an impurity-doped amorphous silicon layer. The data line 428 may include a metallic material. At the same time, a source electrode 430 overlapping the gate electrode 416 and extending from the data line 428, a data pad 714 connected at one end of the data line 428, and a drain electrode 432 spaced apart from the source electrode 430 are formed. A portion of the semiconductor layer 425, corresponding to the source electrode 430 and drain electrode 432, constitutes a semiconductor region "SC." The semiconductor region "SC" may be exposed between the source electrode 430 and drain electrode 432 through an exposure process using a diffraction mask. The exposed semiconductor region "SC" may be referred to as a channel region "ch." The gate electrode 416, the semiconductor region "SC," the source electrode 430 and the drain electrode 432 constitute a thin film transistor (TFT) "T."

Through the second mask process, a pixel connecting line 433 and a capacitor electrode 413 are simultaneously formed with the data line 428. The pixel connecting line 433 is parallel to the data line 428 and connected to the drain electrode 432. The capacitor electrode 413 connected to the pixel connecting line 433 overlaps a previous gate line 412. Substantially, the pixel connecting line 433, the capacitor electrode 413 and the drain electrode 432 may be formed as a unitary pattern.

Figure 10C:
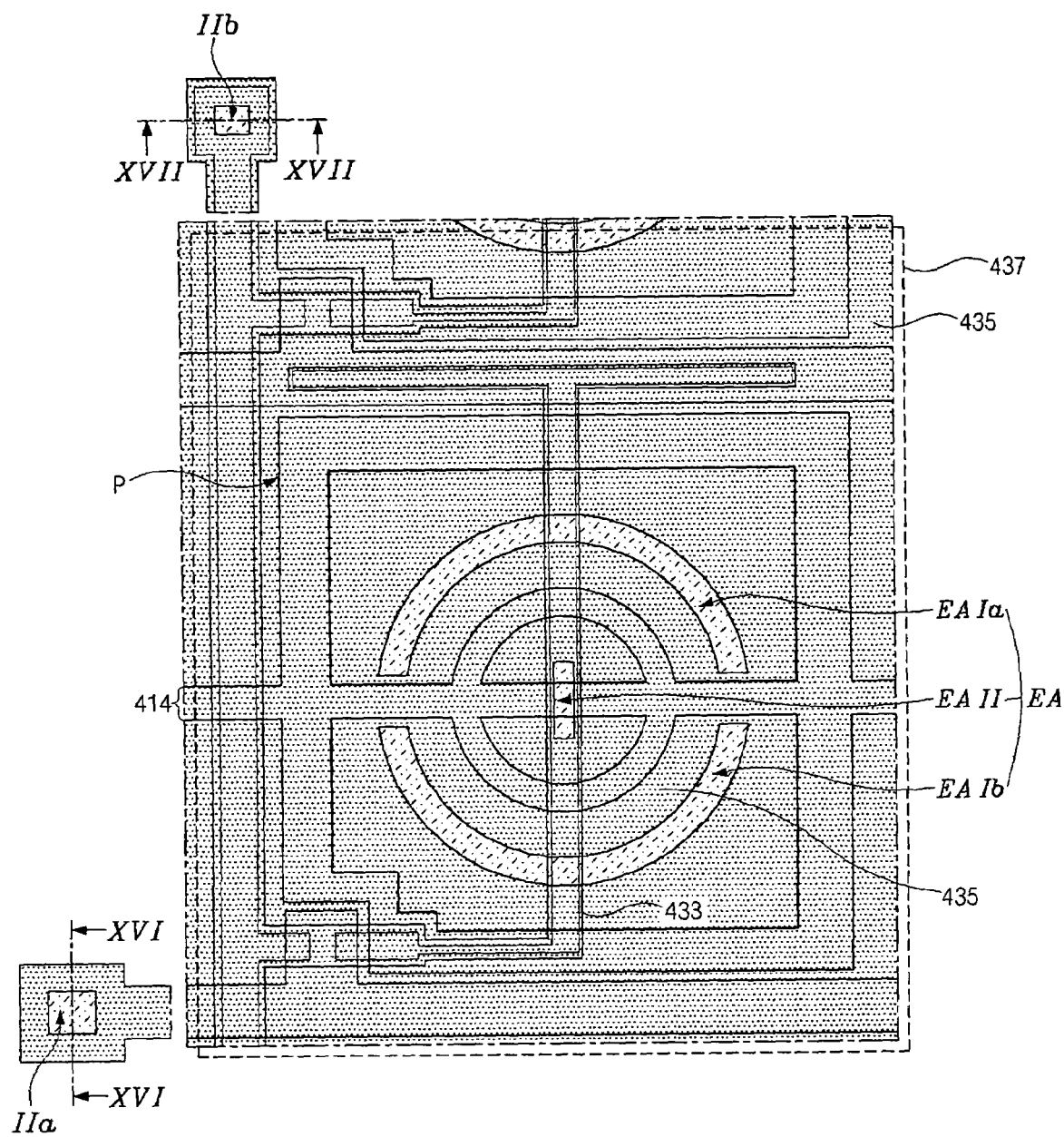
Figure 16C:
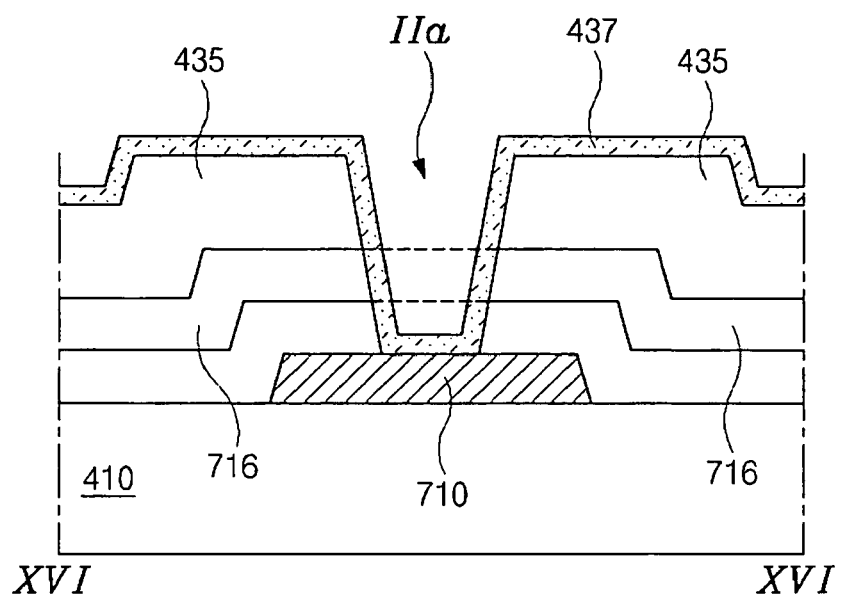
Figure 17C:
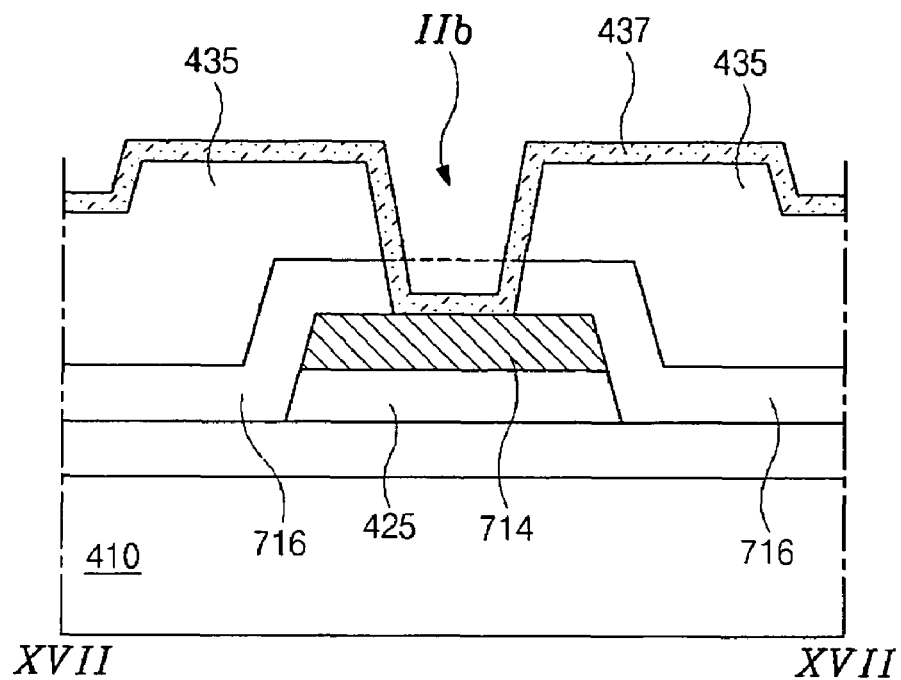

In FIGS. 10C, 16C and 17C, a passivation layer 716 is formed over an entire of the substrate 410, and then a photoresist (PR) pattern 435 is formed on the passivation layer over the TFT "T" through a third mask process. The PR pattern 435 includes an electrode area "EA" where a PR material is removed. At this time, the PR material in gate and data pad openings IIa and IIb is also removed. After removing the PR material in the electrode area "EA" and the pad openings IIa and IIb, portions of the passivation layer 716 and gate insulating layer 712 corresponding the pad openings IIa and IIb and the electrode area "EA" are also removed by an etching process. Thus, the electrode area "EA" exposes the pixel connecting line 433, and the gate and data pad openings IIa and IIb expose the gate and data pads 710 and 714, respectively.

The electrode area "EA" includes first and second electrode area "EAI" and "EAII." The first electrode area "EAI" has a ring shape between the first common electrode pattern 420a and second common electrode pattern 420b. The second electrode area "EAII" has a circular shape and is at a center portion of the pixel connecting line 433. After forming the PR pattern 435, a transparent conductive layer 437 is formed over an entire surface of the substrate 410 including the PR pattern 435.

Figure 10D:
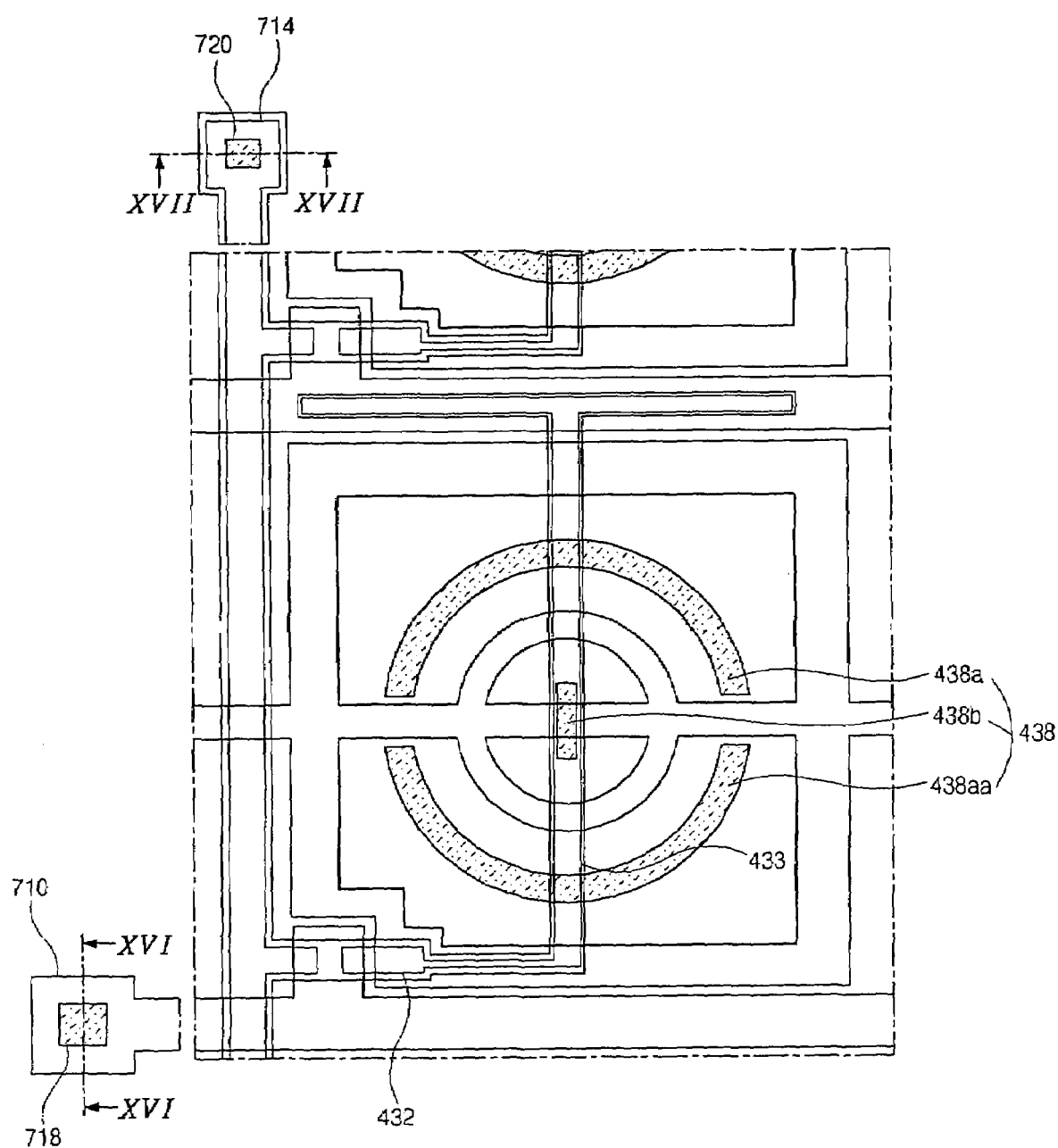
Figure 16D:
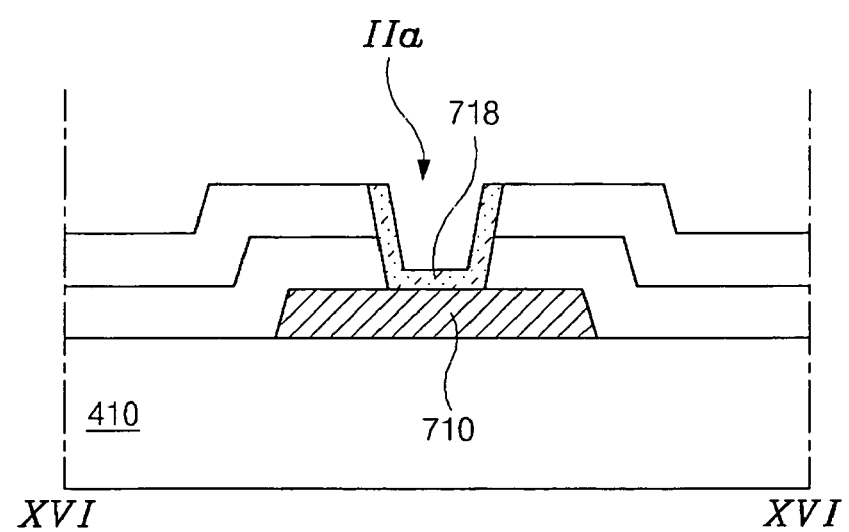
Figure 17D:
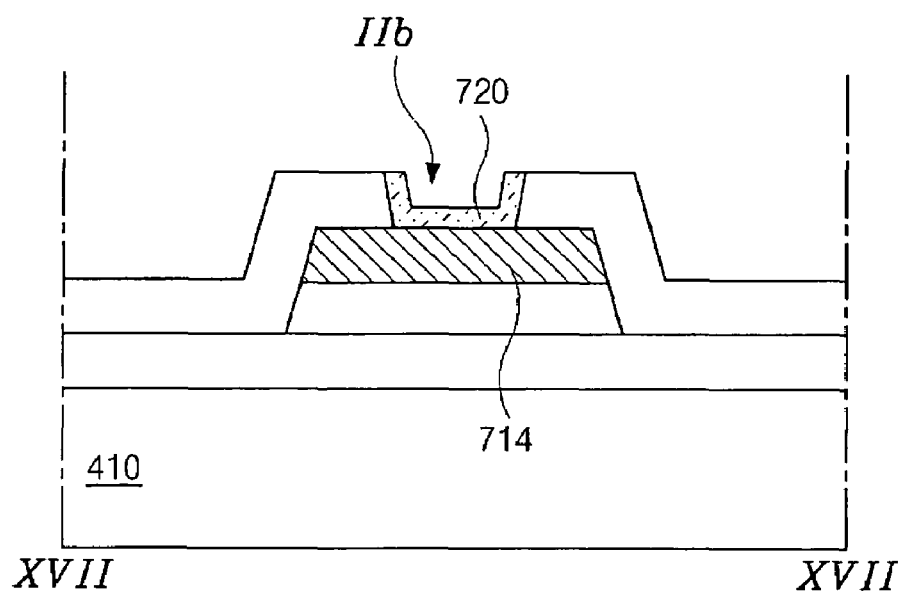

As shown in FIGS. 10D, 16D and 17D, a pixel electrode 438 is obtained by stripping the PR pattern 435 (of FIG. 10C). At this time, a gate pad terminal 718 and a data pad terminal 720 are also formed over the gate and data pads 710 and 714, respectively. The gate pad terminal 718 contacts the gate pad 710 through the gate pad opening IIa, and the data pad terminal 720 contacts the data pad 714 through the data pad opening IIb.

When the PR pattern 435 (of FIG. 10C) is stripped out, a portion of the transparent conductive layer 437 (of FIG. 10C) on the PR pattern 435 (of FIG. 10C) is also removed. Accordingly, only the other portion of the transparent conductive layer 437 (of FIG. 10C) remains and the residual transparent conductive layer becomes the pixel electrode 438, the gate pad terminal 718 and the data pad terminal 720. In this step of the lift-off process shown in FIGS. 10D, 16D and 17D, an additional photolithographic process including exposure and development is not necessary.

Figure 11A:
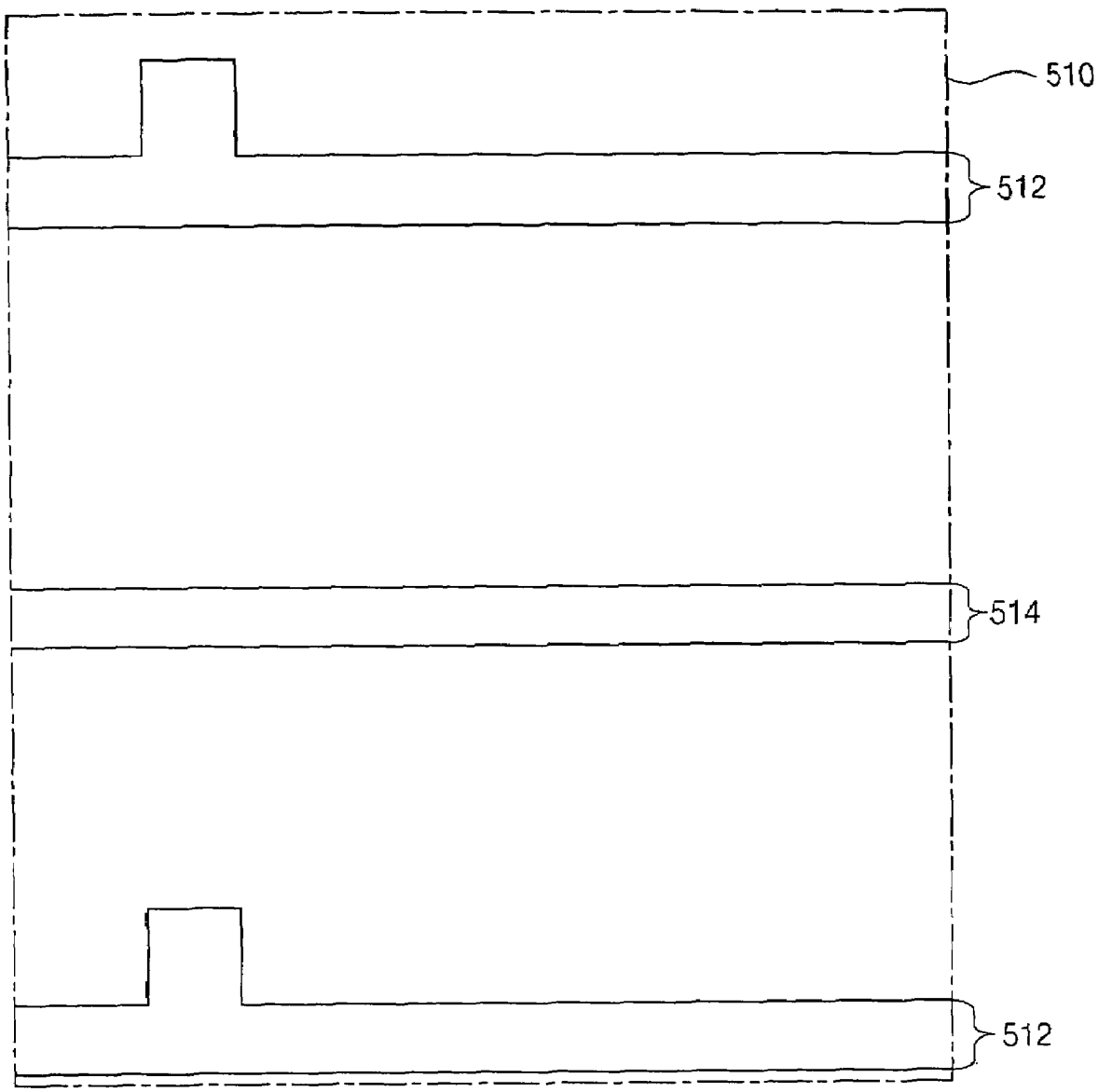
FIGS. 11A to 11D are plan views showing a three mask process of fabricating an array substrate for an IPS-LCD device according to a fifth embodiment of the present invention.

The pixel electrode 438 includes first pixel electrode pattern 438a and second pixel electrode pattern 438b. The first pixel electrode pattern 438a has a semicircular shape and is positioned between the first common electrode pattern 420a and the second common electrode pattern 420b. The second pixel electrode pattern 438b has a rod shape and is positioned at the center portion of the pixel connecting line 433, especially within the area of the pixel connecting line 433. The first pixel electrode pattern 438a and second pixel electrode pattern 438b may directly contact the pixel connecting line 433. Thus, as shown in FIG. 10D, there are substantially concentric rings of pixel and common electrode patterns FIGS. 11A to 11D are plan views showing a three mask process of fabricating an array substrate for an IPS-LCD device according to a fifth embodiment of the present invention. As shown in FIG. 11A, a gate line 512 and a common line 514 are formed on a substrate 510 through a first mask process. At the same time, a gate electrode 516 connected to the gate line 512 may be formed.

Figure 11B:
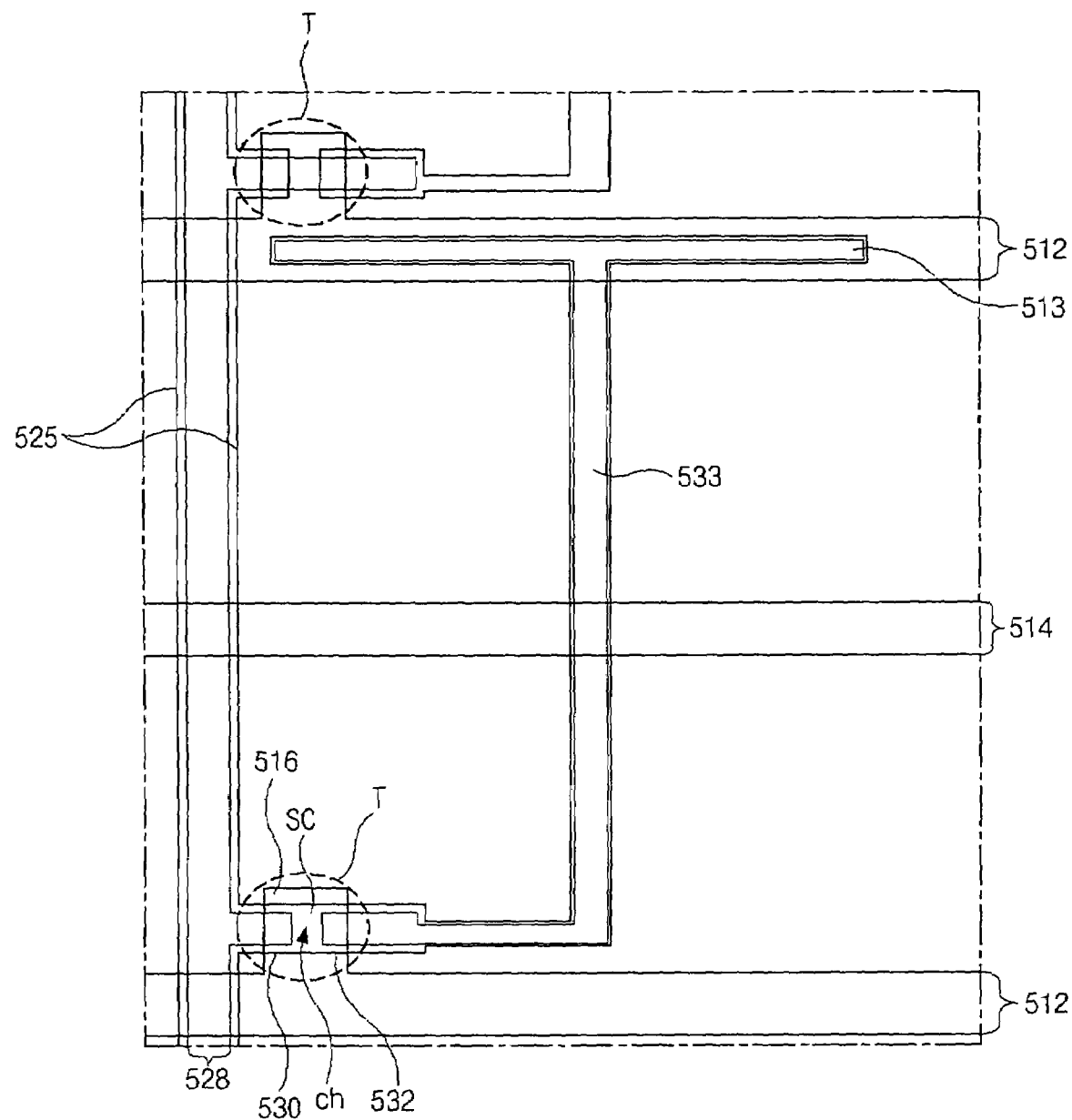

As shown in FIG. 11B, after forming a gate insulating layer (not shown) on the gate line 512 and the common line 514, a semiconductor layer 525 and a data line 528 are subsequently formed on the gate insulating layer through a second mask process. The semiconductor layer 525 may be multiple layers that include an intrinsic amorphous silicon layer and an impurity-doped amorphous silicon layer. The data line 528 may include a metallic material. At the same time, a source electrode 530 overlapping the gate electrode 516 and extending from the data line 528, and a drain electrode 532 spaced apart from the source electrode 530 are formed. A portion of the semiconductor layer 525 corresponding to the source electrode 530 and drain electrode 532 constitutes a semiconductor region "SC." The semiconductor region "SC" may be exposed between the source electrode 530 and drain electrode 532 through an exposure process using a diffraction mask. The exposed semiconductor region "SC" may be referred to as a channel region "ch." The gate electrode 516, the semiconductor region "SC," the source electrode 530 and the drain electrode 532 constitute a thin film transistor (TFT) "T."

Through the second mask process, a pixel connecting line 533 and a capacitor electrode 513 are simultaneously formed with the data line 528. The pixel connecting line 533 is parallel with the data line 528 and connected to the drain electrode 532. The capacitor electrode 513 connected to the pixel connecting line 533 overlaps a previous gate line 512. Substantially, the pixel connecting line 533, the capacitor electrode 513 and the drain electrode 532 may be formed as a single pattern.

Figure 11C:
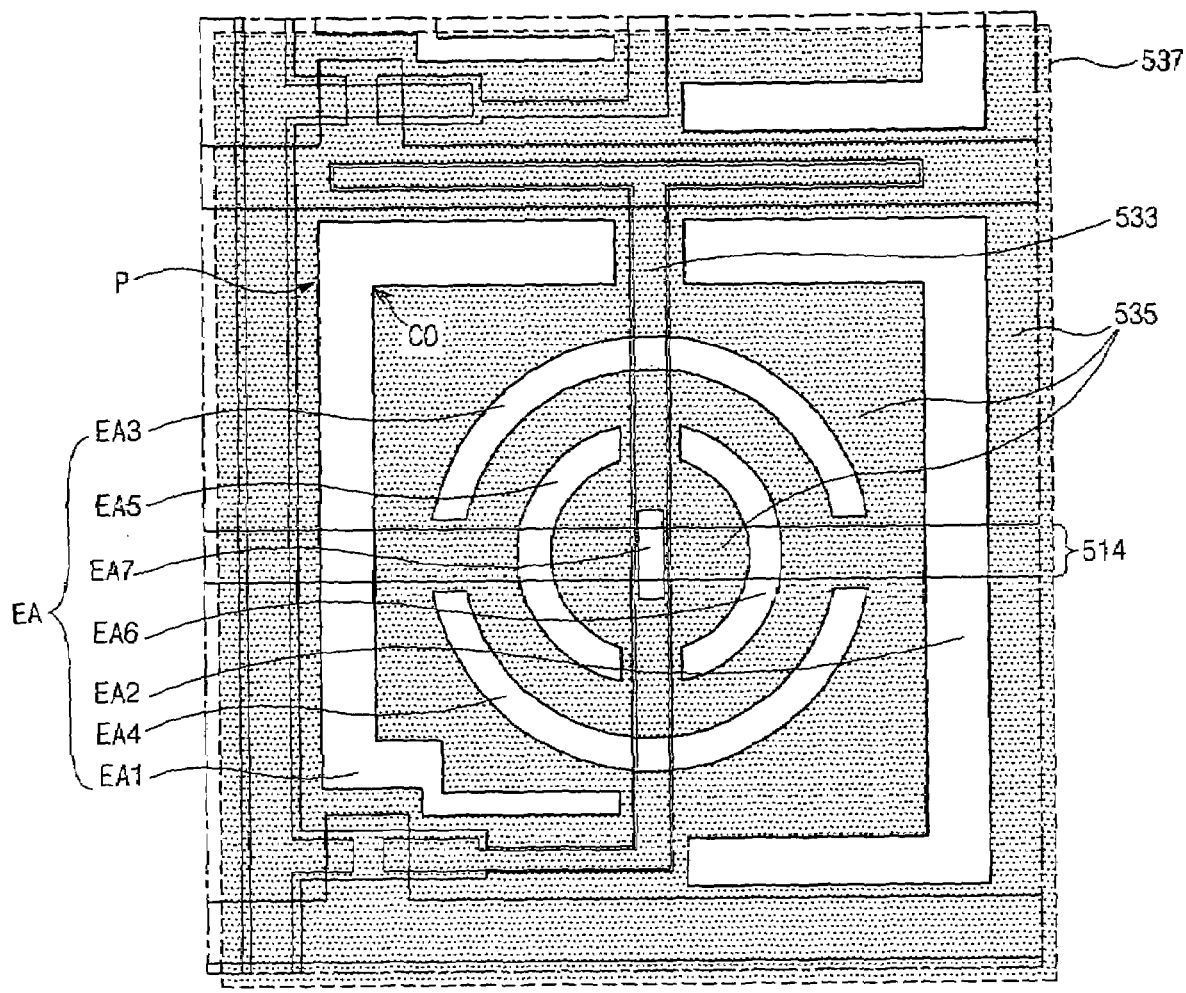

In FIG. 11C, a photoresist (PR) pattern 535 is formed on the TFT "T" through a third mask process. The PR pattern 535 includes an electrode area "EA" where PR material is removed. The electrode area "EA" includes first to seventh electrode areas "EA1" to "EA7." The first electrode area "EA1" and second electrode area "EA2" are adjacent to a boundary portion of the pixel region "P." In addition, the first electrode area "EA1" and second electrode area "EA2" includes corner portions "CO." The third electrode area "EA3" and fourth electrode area "EA4" are half-ring shapes respectively above and below the common line 514. The fifth electrode area "EA5" and sixth electrode area "EA5" and "EA6" are half-ring shapes respectively left and right of the pixel connecting line 533. The seventh electrode area "EA7" is elongated and disposed in the middle of the pixel so as to be in correspondence with the pixel connecting line 533 and within the boundary of the pixel connecting line 533.

After forming the PR pattern 535, the gate insulating layer (not shown) is etched using the PR pattern 535 as an etching mask. Accordingly, the gate insulating layer in the first electrode area "EA1" to the sixth electrode area "EA6" is removed. Since the pixel connecting line 533 covers the gate insulating layer in the seventh electrode area "EA7," the gate insulating layer in the seventh electrode area "EA7" is not removed and the common line 514 in the seventh electrode area "EA7" is not exposed. After etching the gate insulating layer, a transparent conductive layer 537 is formed on an entire surface of the substrate 510 including the PR pattern 535.

Figure 11D:
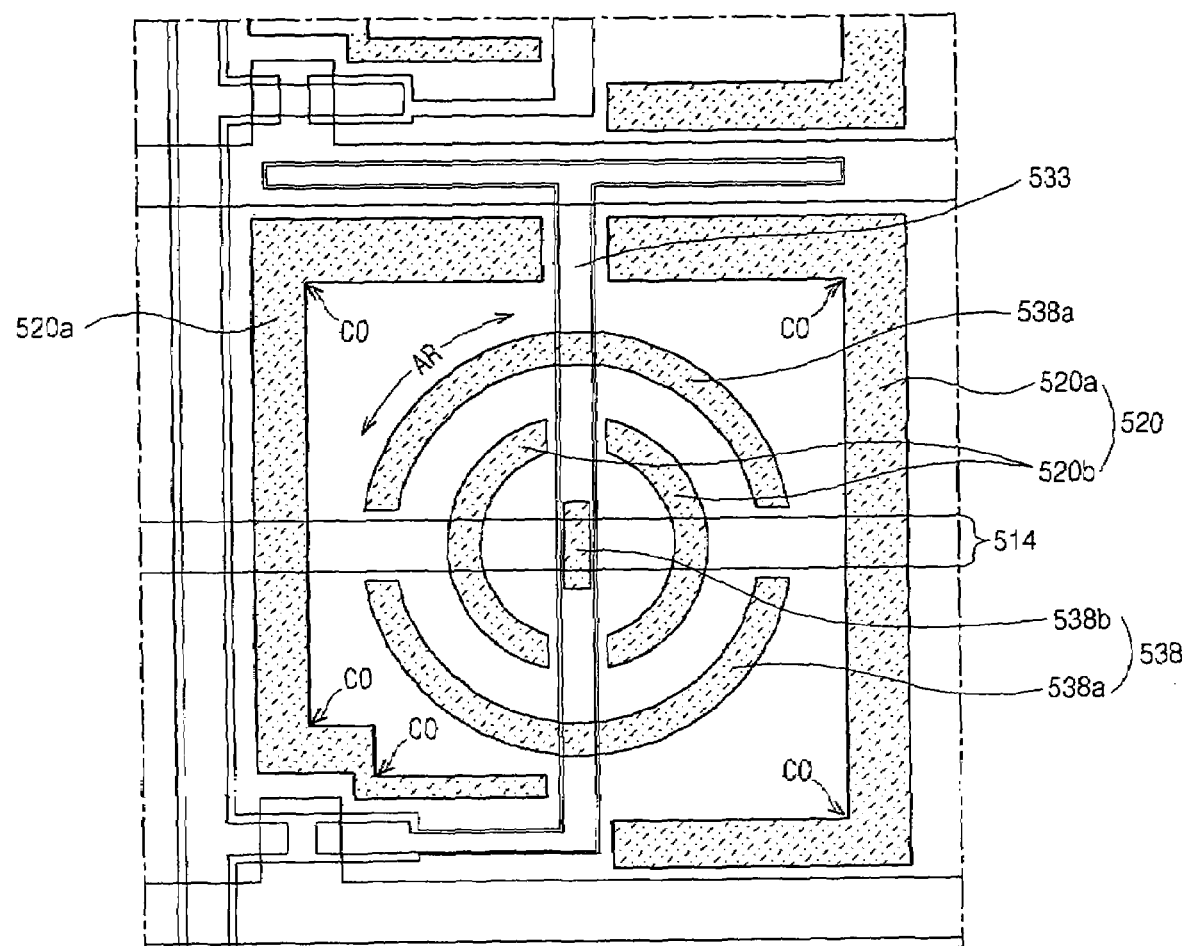

In FIG. 11D, a pixel electrode 538 and a common electrode 542 are obtained by stripping the PR pattern 535 (of FIG. 11C). When the PR pattern 535 (of FIG. 11C) is stripped out, a portion of the transparent conductive layer 537 (of FIG. 11C) on the PR pattern 535 (of FIG. 11C) is also removed. Accordingly, only the other portion of the transparent conductive layer 537 (of FIG. 11C) remains and the residual transparent conductive layer becomes the pixel electrode 538 and the common electrode 542. In this step of the lift-off process shown in FIG. 11D, an additional photolithographic process including exposure and development is not necessary.

The pixel electrode 538 includes first electrode pattern 538a and second pixel electrode pattern 538b. The common electrode 520 includes first common electrode pattern 520a and second common electrode pattern 520b. The first electrode area "EA1" and second electrode area "EA2" (of FIG. 11C) correspond to the first common electrode pattern 520a. The third electrode area "EA3" and fourth electrode area "EA4" (of FIG. 11C) correspond to the first pixel electrode pattern 538a. The fifth electrode area "EA5" and sixth electrode area "EA6" (of FIG. 11C) correspond to the second common electrode pattern 520b. The seventh electrode area "EA7" corresponds to the second pixel electrode pattern 538b. Since the gate insulating layer (not shown) on the common line 514 in the first, second, fifth and sixth electrode areas (of FIG. 11C) is removed, the first electrode pattern 520a and second common electrode pattern 520b directly contact the common line 514. Moreover, the first pixel electrode pattern 538a and second pixel electrode pattern 538b may directly contact the pixel connecting line 533.

In the fifth embodiment, the pixel electrode 538 and the common electrode 520 are formed in the same layer, and may directly contact the pixel connecting line 533 and the common line 514, respectively. However, if the common electrode 520 crosses the pixel connecting line 533, the common electrode 520 may directly contact the pixel connecting line 533 to cause undesirable electric shortage. Similarly, if the pixel electrode crosses the common line 514, the pixel electrode 538 may directly contact the common line 514. Accordingly, the common electrode 520 and the pixel electrode 538 are disposed not to overlap the pixel connecting line 533 and the common line 514, respectively. The first common electrode pattern 520a having a rectangular ring shape includes two separate portions and the second common electrode pattern 520b also has two separate portions having a half-ring shape inside the first common electrode pattern 520a. The first pixel electrode pattern 538a also has two separated portions having a half-ring shape between the first and second common electrode patterns 520a and 520b. In particular, the second pixel electrode pattern 538b is disposed only within the boundaries of the pixel connecting line 533. Moreover, since the first common electrode pattern 520a has corner portions "CO," the aperture ratio is improved. In other words, an aperture area "AA" defined by a space between the first common electrode pattern 520a and the pixel electrode 538 is enlarged due to the corner portions "CO."

Figure 12:
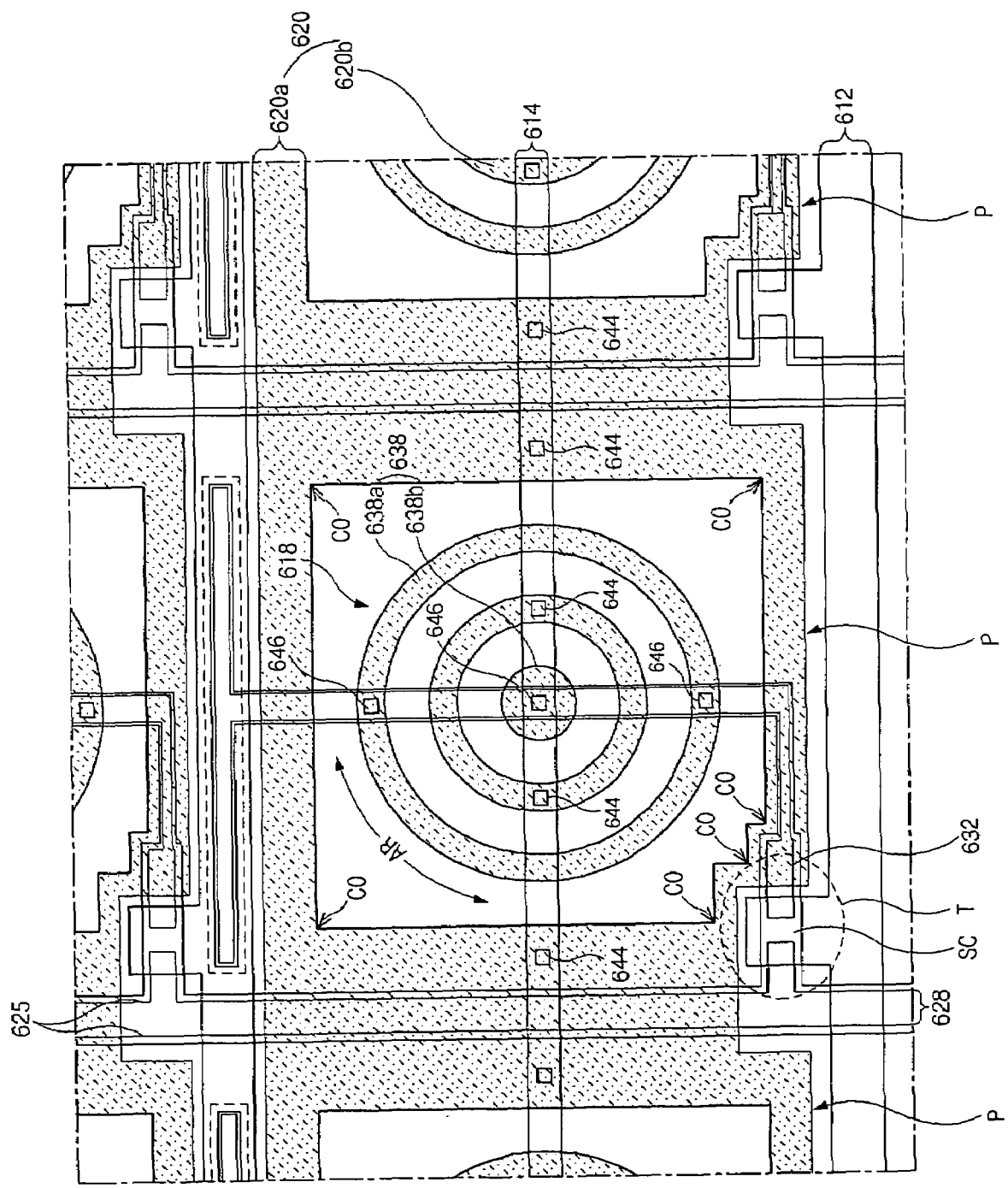
FIG. 12 is a plan view of an array substrate for an IPS-LCD device according to a sixth embodiment of the present invention.

FIG. 12 is a plan view of an array substrate for an IPS-LCD device according to a sixth embodiment of the present invention. As shown in FIG. 12, gate line 612 is transversely arranged across the figure and a data line 628 is disposed substantially perpendicular to the gate line 612.

The gate line 612 and data line 628 define a pixel region "P" on an array substrate. A semiconductor layer 625 is formed to have a structure corresponding to the data line 628. A thin film transistor (TFT) "T" is connected to the gate line 612 and the data line 628, and the semiconductor layer 625 of the TFT "T" constitutes a semiconductor region "SC."

A common electrode 620, including a first common electrode pattern 620a and a second common electrode pattern 620b, is formed in the pixel region "P." A substantially rectangular shaped open region 618 is formed within the first common electrode pattern 620a. The second common electrode pattern 620b has a ring shape within the substantially rectangular shaped open region 618 of the first common electrode pattern 620a.

A pixel electrode 638 includes first pixel electrode pattern 638a and second pixel electrode pattern 638b. The first pixel electrode pattern 638a having a ring shape is disposed between the first common electrode pattern 620a and second common electrode pattern 620b. The second pixel electrode pattern 638b having a circular shape is disposed inside the ring-shaped second common electrode pattern 620b at the center of the pixel. The pixel electrode 638 and the common electrode 620 may be formed of the same material through the same process. For example, the pixel electrode 638 and the common electrode 620 may be formed of a transparent conductive material using a lift-off process.

A passivation layer (not shown) having a low dielectric constant is interposed between the data line 628 and the common electrode 620. For example, benzocyclobutene (BCB) or acrylic resin may be used as the passivation layer. The common electrode 620 is connected to the common line 614 through a first contact hole 644 in the passivation layer, and the pixel electrode 638 is connected to the drain electrode 632 through a second contact hole 646 of the passivation layer.

In the sixth embodiment, since the first common electrode pattern 620a has a substantially rectangular ring shape and the open portion 618 of the first common electrode pattern 620a has corner portions "CO," aperture ratio is improved. In other words, an aperture area "AA" defined by a space between the first common electrode pattern 620a and the pixel electrode 638 is enlarged due to the corner portions. Moreover, since the passivation layer having a low dielectric constant is interposed between the data line 628 and the common electrode 620, electric interferences may be reduced. Accordingly, the common electrode 620 is enlarged and aperture ratio is further improved.

The array substrate shown in FIG. 12 includes the passivation layer having contact holes for high aperture ratio. Thus, the array substrate of FIG. 12 may be formed through a four mask process where a common electrode and a pixel electrode are formed of the same material through the same process.

Figure 13:
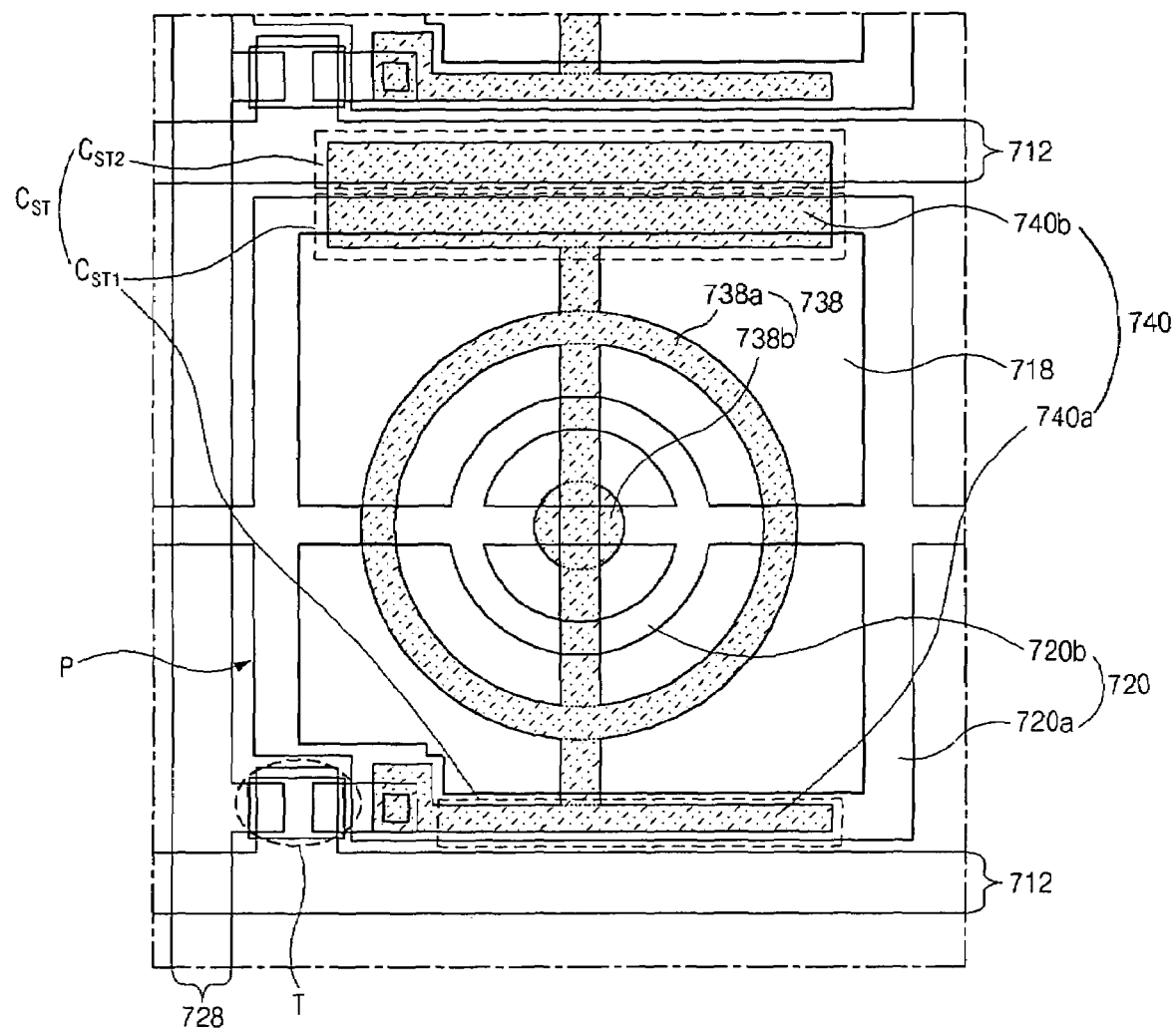
FIG. 13 is a plan view of an array substrate for an IPS-LCD device according to a seventh embodiment of the present invention.

FIG. 13 is a plan view of an array substrate for an IPS-LCD device according to a seventh embodiment of the present invention. As shown in FIG. 13, a gate line 712 is transversely arranged across the figure and a data line 728 is disposed substantially perpendicular to the gate line 712. The gate line 712 and data line define a pixel region "P" on an array substrate. A thin film transistor (TFT) "T" is connected to the gate line 712 and the data line 728.

A common electrode 720, including first common electrode patterns 720a and second common electrode pattern 720b, is formed in the pixel region "P." A substantially rectangular shaped open region 718 is formed within the first common electrode pattern 720a. The second electrode pattern 720b has a ring shape within the substantially rectangular shaped open region 618 of the first common electrode pattern 720a.

A pixel electrode 738 includes first pixel electrode pattern 738a and second pixel electrode pattern 738b. The first pixel electrode pattern 738a having a ring shape is disposed between the first electrode patterns 720a and second common electrode patterns 720b. The second pixel electrode pattern 738b having a circular shape is disposed inside the ring-shaped second common electrode pattern 720b.

A capacitor electrode 740 including first capacitor electrode pattern 740a and second capacitor electrode pattern 740b is connected to the TFT "T." The first capacitor electrode pattern 740a overlaps a bottom portion of the first common electrode pattern 720a and the second capacitor electrode pattern 740b overlaps a top portion of the first common electrode pattern 720a and the previous gate line 712 for a neighboring pixel region. The overlapped portion of the first capacitor electrode pattern 740a and the first common electrode pattern 720a together with the overlapped portion of the second capacitor electrode pattern 740b and the first common electrode pattern 720 constitute a first storage capacitor "$C_{ST1}$." In addition, the overlapped portion of the second capacitor electrode 740b and the previous gate line 712 constitutes a second storage capacitor "$C_{ST2}$." Since the first second storage capacitor "$C_{ST1}$" and second storage capacitor "$C_{ST1}$" and "$C_{ST2}$" are parallel connected to the TFT "T," an improved total storage capacitor "$C_{ST}$" is obtained without reduction of the aperture ratio.

Figure 14:
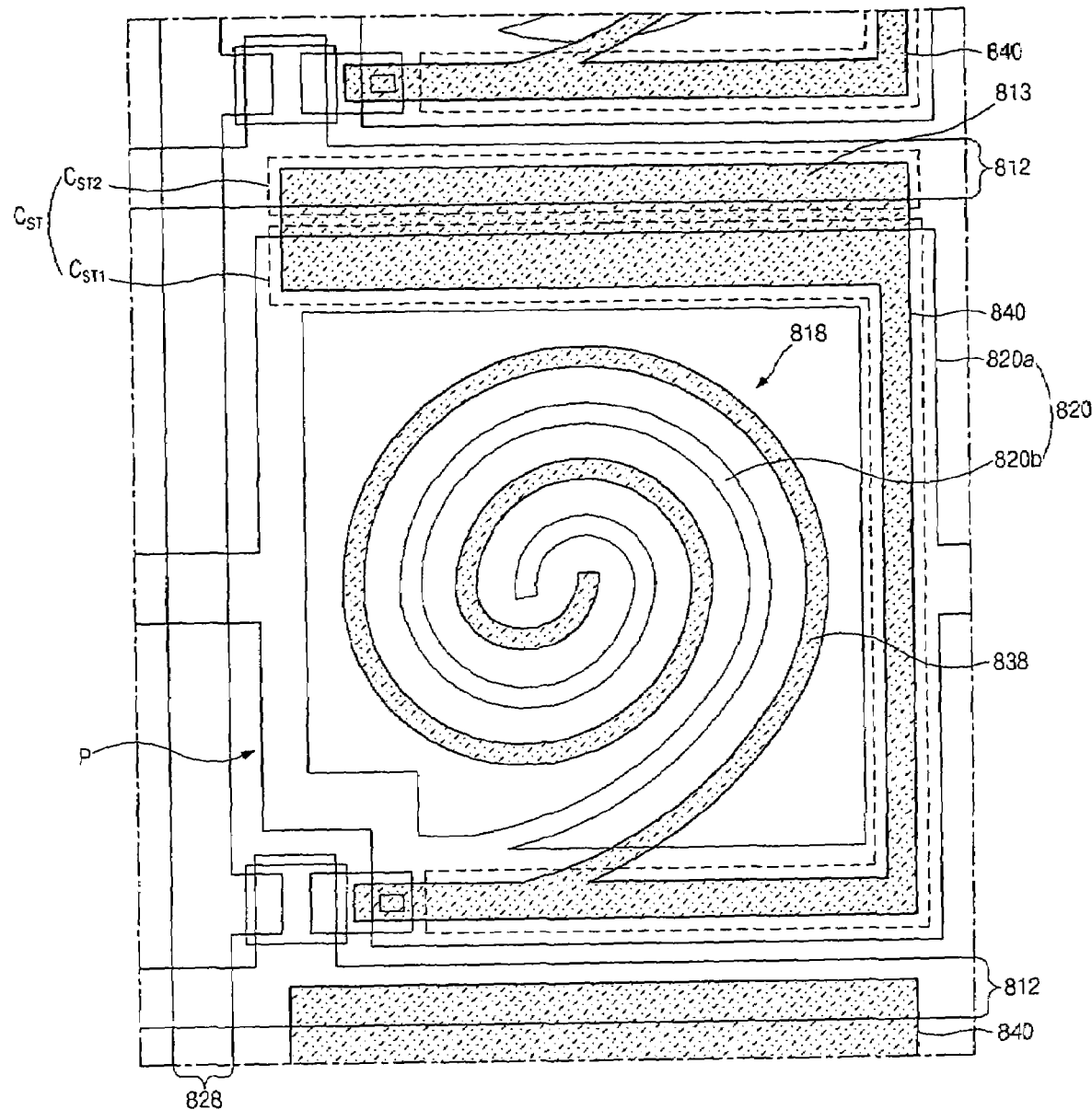
FIG. 14 is a plan view of an array substrate for an IPS-LCD device according to an eighth embodiment of the present invention.

FIG. 14 is a plan view of an array substrate for an IPS-LCD device according to an eighth embodiment of the present invention. As shown in FIG. 14, a gate line 812 is transversely arranged across the figure and a data line 828 is disposed substantially perpendicular to the gate line 812. The gate line 812 and data line 828 define a pixel region "P" on an array substrate. A thin film transistor (TFT) "T" is connected to the gate line 812 and the data line 828.

A common electrode 820, including first common electrode pattern 820a and second common electrode pattern 820b, is formed in the pixel region "P." A substantially rectangular shaped open region 818 is formed within the first common electrode pattern 820a. The second common electrode pattern 820b has a spiral shape that extends from the first common electrode pattern 820a into the substantially rectangular shaped open region 818.

A capacitor electrode 840 connected to the TFT "T" overlaps the first common electrode pattern 820a and a previous gate line 812 in a neighboring pixel region. The overlapped portion of the capacitor electrode 840 and the first common electrode 820a constitutes a first storage capacitor "$C_{ST1}$." The overlapped portion of the capacitor electrode 840 and the previous gate line 812 constitutes a second storage capacitor "$C_{ST2}$." Since the capacitor electrode 840 overlaps the first common electrode 820a not only in two transverse portions but also in a vertical portion, the first storage capacitor has larger capacitance. Accordingly, a total storage capacitor "$C_{ST}$" has improved capacitance without reduction of the aperture ratio and the IPS-LCD device can be stably driven.

Figure 15:
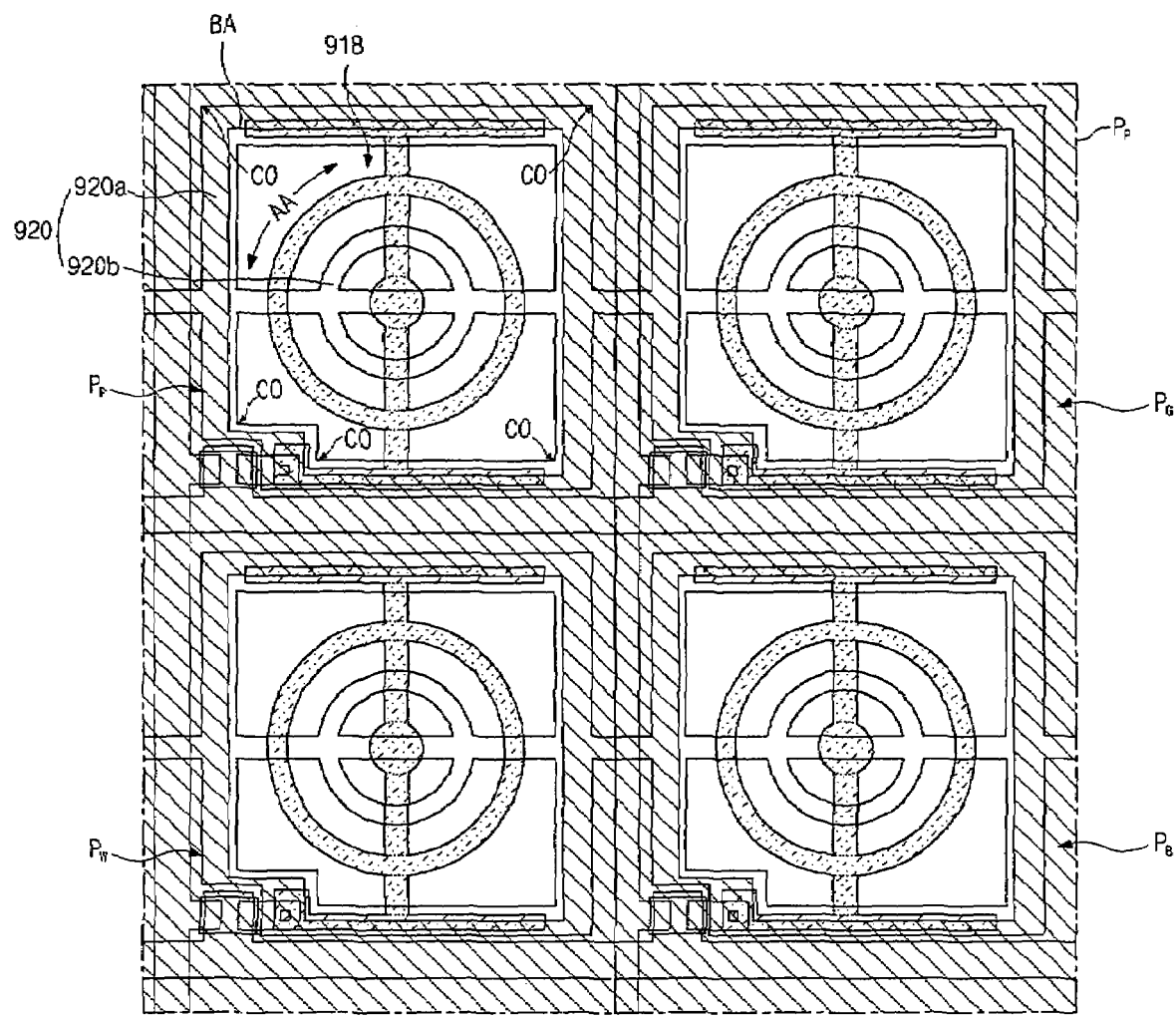
FIG. 15 is a plan view of an array substrate for an IPS-LCD device according to ninth embodiment of the present invention.

FIG. 15 is a plan view of an array substrate for an IPS-LCD device according to ninth embodiment of the present invention. In ninth embodiment of the present invention, the IPS-LCD device includes red, green, blue and white sub-pixel regions in a square shape. As shown in FIG. 15, red, green, blue and white sub-pixel regions "$P_R$," "$P_G$," "$P_B$," and "$P_W$" constitute one pixel region "$P_P$" having a square shape. A common electrode 920, including first common electrode pattern 920a and second common electrode pattern 920b, is formed in each of the sub-pixel regions "$P_R$," "$P_G$," "$P_B$," and "$P_W$." The first common electrode pattern 920a for all of the sub-pixels includes a substantially rectangular shaped open region 918 adjacent to the boundaries of each of the sub-pixel regions "$P_R$," "$P_G$," "$P_B$," and "$P_W$." The second common electrode pattern 920b for each of the sub-pixel regions "$P_R$," "$P_G$," "$P_B$," and "$P_W$" is a ring shape at the center of the rectangular shaped open region 918 of each of the sub-pixel regions "$P_R$," "$P_G$," "$P_B$," and "$P_W$." 918.

Since each of the sub-pixel regions "$P_R$," "$P_G$," "$P_B$," and "$P_W$" has a first common electrode pattern 920a with corner portions "CO," the aperture area "AA" is enlarged. A black matrix area "BA" where a black matrix may be formed may have an opening corresponding to the open portion 918 of the first common electrode pattern 920a. Since the black matrix area (BA) can be reduced in accordance with the enlargement of the rectangular shaped open regions, the aperture ratio of the IPS-LCD device is further improved.

In the present invention, since the common electrode and the pixel electrode have a circular shape, directors of liquid crystal molecules are the same in all directions. Thus, contrast ratio and viewing angle are improved without color inversion in a specific angle. In addition, since an outermost common electrode pattern of a rectangular ring shape has an open portion including corner portions, aperture area is enlarged. Accordingly, aperture ratio is improved because a black matrix can be designed to correspond to the outermost common electrode pattern. When four color sub-pixel regions of a square shape constitute one pixel region, the aperture ratio is further improved.

It will be apparent to those skilled in the art that various modifications and variation can be made in an array substrate of the present invention without departing from the spirit or scope of the invention. Thus, it is intended that the present invention cover the modifications and variations of this invention provided they come within the scope of the appended claims and their equivalents.

What is claimed is:

1. An array substrate for an in-plane switching liquid crystal display device, comprising:
    a gate line on a substrate;
    a data line crossing the gate line to define a pixel region;
    a thin film transistor connected to the gate line and the data line;
    a common line parallel to and spaced apart from the gate line;
    a common electrode extending from the common line and including a plurality of common electrode patterns;
    a pixel connecting line connected to a capacitor electrode; and
    a pixel electrode extending from the pixel connecting line and including a plurality of pixel electrode patterns,
    wherein one of the plurality of common electrode patterns and one of the plurality of pixel electrode patterns form concentric rings of pixel and common electrode patterns that are within an open region of another one of the plurality of common electrode patterns.

2. The array substrate of claim 1, wherein another one of the plurality of pixel electrode patterns is a circular shape at the center of the pixel region.

3. The array substrate of claim 1, wherein the open region of another one of the plurality of common electrode patterns has a substantially rectangular shape.

4. The array substrate of claim 1, wherein the open region of another one of the plurality of common electrode patterns has a substantially circular shape.

5. The array substrate of claim 1, wherein the pixel region has a square shape.

6. The array substrate of claim 5, wherein neighboring four pixel regions correspond to red, green, blue and white colors, respectively.

7. The array substrate of claim 1, further comprising a black matrix having an opening larger than the open region of another one of the plurality of common electrode patterns.

8. The array substrate of claim 1, wherein the capacitor electrode and the another one of the plurality of common electrode patterns overlap each other and constitute a first storage capacitor.

9. The array substrate of claim 8, wherein the capacitor electrode overlaps a previous gate line in a neighboring pixel region and constitutes a second storage capacitor.

10. An array substrate for an in-plane switching liquid crystal display device, comprising:
    a gate line on a substrate;
    a data line crossing the gate line and defining a pixel region;
    a thin film transistor including a drain electrode and connected to the gate line and the data line;
    a common line parallel to and spaced apart from the gate line;
    a pixel connecting line extending from the drain electrode;
    a passivation layer having first and second contact holes on the pixel connecting line, the first contact hole exposing the common electrode and the second contact hole exposing the pixel connecting line;
    a common electrode contacting the common line through the first contact hole and including a plurality of common electrode patterns; and
    a pixel electrode contacting the pixel connecting line through the second contact hole and including a plurality of pixel electrode patterns,
    wherein one of the plurality of common electrode patterns and one of the plurality of pixel electrode patterns form concentric rings of pixel and common electrode patterns that are within an open region of another one of the plurality of common electrode patterns.

11. The array substrate of claim 10, wherein another one of the plurality of pixel electrode patterns is a circular shape at the center of the pixel region.

12. The array substrate of claim 10, wherein the open region of another one of the plurality of common electrode patterns has a substantially rectangular shape.

13. The array substrate of claim 10, wherein the common electrode and pixel electrode are formed of the same material.

14. The array substrate of claim 10, wherein the pixel region has a substantially square shape.

15. The array substrate of claim 14, wherein neighboring four pixel regions correspond to red, green, blue and white colors, respectively.

16. The array substrate of claim 10, further comprising a black matrix having an opening larger than the open region of another one of the plurality of common electrode patterns.

17. The array substrate of claim 10, wherein the pixel connecting line overlaps the common electrode and constitutes a first storage capacitor.

18. The array substrate of claim 17, wherein the pixel connecting line overlaps a previous gate line in a neighboring pixel region and constitutes a second storage capacitor.

19. The array substrate of claim 10, wherein the another one of the plurality of common electrode patterns covers the data line.

20. The array substrate of claim 10, wherein the passivation layer includes one of benzocyclobutene and acrylic resin.

21. A method of fabricating an array substrate for an in-plane switching liquid crystal display device, comprising:
forming a gate line having a gate electrode, a common electrode including a plurality of common electrode patterns and a common line parallel to and spaced apart from the gate line on a substrate through a first mask process;
forming a gate insulating layer on the gate line, the common electrode and the common line;
forming a data line crossing the gate line and defining a pixel region, a source electrode extending from the data line, a drain electrode spaced apart from the source electrode and a semiconductor layer corresponding to the data line, the source electrode and the drain electrode through a second mask process, the semiconductor layer being exposed between the source and drain electrodes, the gate electrode, the semiconductor layer, the source electrode and the drain electrode constituting a thin film transistor;
forming a passivation layer on the thin film transistor through a third mask process, the passivation layer having a drain contact hole exposing the drain electrode; and
forming a capacitor electrode overlapping the common electrode and being connected to the drain electrode, a pixel connecting line connected to the capacitor electrode and a pixel electrode extending from the pixel connecting line and including a plurality of pixel electrode patterns on the passivation layer through a fourth mask process,
wherein one of the plurality of common electrode patterns and one of the plurality of pixel electrode patterns form concentric rings of pixel and common electrode patterns that are within an open region of another one of the plurality of common electrode patterns.

22. The method of claim 21, further comprising forming a black matrix having an opening larger than the open region of another one of the plurality of common electrode patterns.

23. A method of fabricating an array substrate for an in-plane switching liquid crystal display device, comprising:
forming a gate line having a gate electrode, a common electrode including a plurality of common electrode patterns and a common line parallel to and spaced apart from the gate line on a substrate through a first mask process;
forming a gate insulating layer on the gate line, the common electrode and the common line;
forming a data line crossing the gate line to define a pixel region, a source electrode extending from the data line, a drain electrode spaced apart from the source electrode, a pixel connecting line extending from the drain electrode, a capacitor electrode extending from the pixel connecting line and a semiconductor layer corresponding to the data line, the source electrode, the drain electrode, the pixel connecting line and the capacitor electrode through a second mask process, the semiconductor layer being exposed between the source and drain electrodes, the gate electrode, the semiconductor layer, the source electrode and the drain electrode constituting a thin film transistor;
forming a photoresist pattern on the thin film transistor through a third mask process, the photoresist pattern corresponding to a plurality of regions between the plurality of common electrode patterns;
forming a conductive layer on an entire surface of the substrate having the photoresist pattern; and
removing the conductive layer on the photoresist pattern by stripping the photoresist pattern to obtain a pixel electrode contacting the pixel connecting line and including a plurality of pixel electrode patterns,
wherein one of the plurality of common electrode patterns and one of the plurality of pixel electrode patterns form concentric rings of pixel and common electrode patterns that are within an open region of another one of the plurality of common electrode patterns.

24. The method of claim 23, wherein the conductive layer is formed of indium tin oxide (ITO).

25. A method of fabricating an array substrate for an in-plane switching liquid crystal display device, comprising:
forming a gate line having a gate electrode and a common line parallel to and spaced apart from the gate line on a substrate;
forming a gate insulating layer on the gate line and the common line;
forming a data line crossing the gate line and defining a pixel region, a source electrode extending from the data line, a drain electrode spaced apart from the source electrode, a pixel connecting line connected to the drain electrode, and a semiconductor layer corresponding to the data line, the source electrode and the drain electrode, the semiconductor layer being exposed between the source and drain electrodes, the gate electrode, the semiconductor layer, the source electrode and the drain electrode constituting a thin film transistor;
forming a passivation layer on the thin film transistor, the passivation layer having a first contact hole exposing the common line and a second contact hole exposing the pixel connecting line;
forming a plurality of common and pixel electrodes on the passivation layer,
wherein the plurality of common and pixel electrodes are formed of concentric rings, the common electrodes connected to the common line through the first contact hole, and the pixel electrode connected to the pixel connecting line through the second contact hole.

26. The method of claim 25, wherein the common and pixel electrodes are formed of indium tin oxide (ITO).

27. The method of claim 25, wherein one of the common electrodes overlaps a portion of the data line.

* * * * *